(12) United States Patent
Tower

(10) Patent No.: US 8,905,075 B2
(45) Date of Patent: Dec. 9, 2014

(54) ROTARY SHEAR VALVE ASSEMBLY WITH HARD-ON-HARD SEAL SURFACES

(75) Inventor: Christopher R. Tower, Rohnert Park, CA (US)

(73) Assignee: IDEX Health & Science LLC, Northbrook, IL (US)

( * ) Notice: Subject to any disclaimer, the term of this patent is extended or adjusted under 35 U.S.C. 154(b) by 649 days.

(21) Appl. No.: 12/833,834

(22) Filed: Jul. 9, 2010

(65) Prior Publication Data

US 2011/0006237 A1  Jan. 13, 2011

Related U.S. Application Data

(60) Provisional application No. 61/225,143, filed on Jul. 13, 2009, provisional application No. 61/301,516, filed on Feb. 4, 2010, provisional application No. 61/328,594, filed on Apr. 27, 2010.

(51) Int. Cl.
   *F16K 11/074* (2006.01)
   *F16K 27/04* (2006.01)
   *F16K 3/08* (2006.01)

(52) U.S. Cl.
   CPC ............. *F16K 27/045* (2013.01); *F16K 3/08* (2013.01)
   USPC ............. 137/625.15; 137/625.46; 251/192; 251/208; 251/209; 251/314

(58) Field of Classification Search
   USPC ......... 251/205, 208, 209, 180, 181, 192, 157, 251/176, 304, 314; 137/625.15, 876, 137/625.46
   See application file for complete search history.

(56) References Cited

U.S. PATENT DOCUMENTS 1,207,482 A * 12/1916 Bloom ................. 137/625.15
3,203,249 A *  8/1965 Jentzsch et al. .......... 73/23.42
3,230,048 A *  1/1966 Skeggs ..................... 422/70

(Continued)

FOREIGN PATENT DOCUMENTS

EP  0 416 294 A1   8/1990
EP  0 508 749 A2  10/1992

(Continued)

OTHER PUBLICATIONS

"Typical Compressive Yield Strength and Compressive Modulus of Polymers" at http://www.matweb.com/reference/compressivestrength.aspx (copyright 1996-2012).*

(Continued)

*Primary Examiner* — John K Fristoe, Jr.
*Assistant Examiner* — Ian Paquette
(74) *Attorney, Agent, or Firm* — Beyer Law Group LLP

(57) ABSTRACT

A multi-position rotary shear valve assembly having a substantially metallic or ceramic stator device and a substantially metallic or ceramic rotor device. The stator device defines a substantially planar stator face and at least two or more stator channels in fluid communication with the stator face at corresponding stator ports, while the rotor device includes a substantially planar rotor face defining one or more rotor channels. A tribological coating is disposed atop at least one of the rotor face and the stator face, which enables a substantially fluid-tight, selective relative rotation between the rotor face and the stator face, at a rotor-stator interface, between two or more rotor positions.

43 Claims, 21 Drawing Sheets

(56) References Cited

U.S. PATENT DOCUMENTS

| | | | |
|---|---|---|---|
| 3,297,053 A * | 1/1967 | McKinney | 137/625.46 |
| 3,929,112 A * | 12/1975 | Pagdin | 123/450 |
| 4,444,066 A * | 4/1984 | Ogle et al. | 73/863.72 |
| 4,550,742 A * | 11/1985 | Stearns | 137/14 |
| 4,846,098 A * | 7/1989 | Kobayashi et al. | 118/300 |
| 4,865,071 A * | 9/1989 | Lambert et al. | 137/312 |
| 4,966,789 A | 10/1990 | Knapp et al. | |
| 5,194,226 A * | 3/1993 | Tomoff et al. | 422/509 |
| 5,620,025 A * | 4/1997 | Lewin | 137/625.15 |
| 5,901,387 A * | 5/1999 | Fan | 4/675 |
| 5,934,320 A * | 8/1999 | O'Reilly et al. | 137/625.21 |
| 6,267,143 B1 * | 7/2001 | Schick | 137/625.11 |
| 6,748,975 B2 * | 6/2004 | Hartshorne et al. | 137/625.46 |
| 7,308,908 B2 * | 12/2007 | Keene et al. | 137/554 |
| 2002/0195150 A1 * | 12/2002 | Schick | 137/625.46 |
| 2003/0196700 A1 | 10/2003 | Gilbert | |
| 2010/0102264 A1 * | 4/2010 | Bickoff et al. | 251/355 |
| 2011/0006237 A1 | 1/2011 | Tower | |

FOREIGN PATENT DOCUMENTS

| | | |
|---|---|---|
| GB | 2 213 912 A | 8/1989 |
| JP | 5-79069 | 3/1993 |
| JP | 5-501903 | 4/1993 |
| JP | 2000-283302 | 10/2000 |
| WO | WO 91/14134 | 9/1991 |

OTHER PUBLICATIONS

International Search Report dated Feb. 8, 2011 from International Application No. PCT/US2010/041612.

Written Opinion dated Feb. 8, 2011 from International Application No. PCT/US2010/041612.

Extended Search Report dated Feb. 25, 2013 from European Application No. 12192555.6-1754.

Japanese Office Action dated Apr. 30, 2014 from Japanese Application No. 2012-520688.

* cited by examiner

ROTARY SHEAR VALVE ASSEMBLY WITH HARD-ON-HARD SEAL SURFACES

RELATED APPLICATIONS

This application claims priority under 35 U.S.C. §119(e) from U.S. Provisional Patent Application Nos. 61/225,143, filed Jul. 13, 2009; 61/301,516, filed Feb. 4, 2010; and 61/328,594, filed Apr. 27, 2010, all of which are entitled "ROTARY SHEAR VALVE ASSEMBLY WITH HARD-ON-HARD SEAL SURFACES", and naming Tower as the inventor, and all of which are incorporated by reference in their entirety.

FIELD OF THE INVENTION

The present invention relates to rotary shear valves, and more particularly, relates to shear valves that incorporate hard-on-hard sealing surfaces.

BACKGROUND OF THE INVENTION

Current high pressure liquid chromatography shear valves typically employ a metallic element and a rotor device composed of a polymer material that forms fluid-tight seal at a rotor/stator interface. While this combination has been found to be successful, it is limited in pressure rating and valve lifetime. For example, applications requiring high pressures above 15 Kpsi and a lifetime greater than about 10K cycles are not consistently attainable and sustainable using this combination.

Accordingly, it is desirable to provide a shear face valve capable of holding pressures greater than about 15 Kpsi that have expected valve lifetimes greater than 50K cycles.

SUMMARY OF THE INVENTION

The present invention provides a rotary shear valve assembly including a stator device that defines a substantially planar stator face and at least two or more stator channels in fluid communication with stator face at corresponding stator ports. The stator face is composed of a substantially metallic or ceramic material. The valve assembly also includes a rotor device that includes a substantially planar rotor face defining one or more rotor channels. The rotor face, similarly is composed of a substantially metallic or ceramic material. In accordance with the present invention, the valve assembly includes a tribological coating disposed atop at least one of the rotor face and the stator face. The rotor device is rotatably mounted about a rotational axis in a manner enabling fluid-tight, selective relative rotation between the rotor face and the stator face, at a rotor-stator interface, between two or more rotor positions.

Accordingly, through the application of a tribological coating, a metal-on-metal stator device/rotor device can be implemented for high fluid pressure applications (i.e., 15 Kpsi to about 25 Kpsi). Hence, not only can a fluid-tight seal at the rotor/stator interface be maintained, but the valve is are also capable of sustaining high lifecycle capacity (i.e., at least about 75K cycles). Moreover, such a tribological coating further functions to reduce the friction between these two opposed, contacting faces.

In one aspect of the present invention, the tribological coating is provided by a Diamond Like Coating (DLC).

In another specific configuration the tribological coating is disposed atop the stator face.

In still another specific embodiment, the rotor face and the stator face is composed of a metallic material such as steel or titanium.

In another aspect of the present invention, the rotor device includes a metallic rotor element containing the substantially planar rotor face. The valve assembly further includes a compliance assembly that cooperates with the rotor device in a manner orienting the substantially planar rotor face substantially parallel to and substantially flush against the substantially planar stator face of the stator device.

In one specific embodiment, the rotor device defines a proximal facing contact surface oriented opposite the rotor face, and the compliance assembly includes a compliant element in supportive abutting contact with the contact surface of the rotor device.

Another specific arrangement provides a rotor assembly that includes a valve shaft, configured for rotation about a rotational axis of the valve assembly, and a head portion disposed at a distal end of the valve shaft. The head portion defines a distal seating surface thereof. The compliant element defines a proximal facing surface oriented opposite the contact surface. The compliant element is disposed between, and in abutting contact with, the contact surface of the rotor device and the distal seating surface of the head portion.

In still another specific embodiment, the compliant element defines a receiving socket, a bottom portion of which is defined by the seating surface. The receiving socket is formed and dimensioned for aligned, sliding axial receipt of a rotor element of the rotor device therein. The receiving socket is further defined by an interior sidewall, formed and dimensioned for press-fit receipt and contact with an outer circumferential wall of the rotor element.

In yet another embodiment, the interior sidewall and the rotor outer circumferential wall cooperate for keyed alignment therebetween. More specifically, the interior sidewall and the rotor outer circumferential wall are D-shaped.

Still another specific configuration provides a rotor assembly that includes a valve shaft, configured for rotation about a rotational axis of the valve assembly, and a head portion disposed at a distal end of the valve shaft. The compliance assembly includes a ball bearing member disposed between the head portion of the rotor assembly and the rotor element, enabling minute compliant pivotal motion of the rotor face about the ball bearing member.

Yet another embodiment provides a head portion having a distal seating surface that defines a dome-shaped socket that is formed and dimensioned for receipt of a portion the ball bearing member therein. The rotor element having a proximal facing contact surface oriented opposite the rotor face, the contact surface defining a dome-shaped ball socket formed and dimensioned for pivotal receipt of another portion the ball bearing member therein.

In this configuration, the compliance assembly further includes a drive ring disposed adjacent the seating surface of the head portion. The drive ring includes an interior wall that defines a central through-passage formed and dimensioned for axial sliding receipt of the rotor element therein. The tolerance is such that minute pivotal movement atop the ball bearing member is permitted.

In one specific embodiment, the compliance assembly further includes an alignment structure configured for aligned cooperation between the rotor element and drive ring. The rotor element includes a substantially cylindrical sidewall extending between the rotor face and the contact surface. The sidewall defines two or more elongated receiving slots oriented substantially parallel to the rotational axis, and axially extending from about a central portion of the sidewall to the contact surface. The alignment structure includes two or more corresponding guide pins extending radially inward from the interior wall of the drive ring. The guide pins being sized and dimensioned for sliding axial receipt in a corresponding receiving slot.

In another aspect of the present invention, a rotary shear valve assembly is provided having a metallic stator device that defines a substantially planar stator face and at least two or more stator channels in fluid communication with stator face at corresponding stator ports. A rotor device is also included having a metallic rotor element that defines a substantially planar rotor face. The valve assembly further includes a compliance assembly that cooperates with the rotor element in a manner orienting the substantially planar rotor face substantially parallel to and substantially flush against the substantially planar stator face of the stator device. Such compliance enables fluid-tight, selective relative rotation between the rotor face and the stator face, at a rotor-stator interface, at two or more rotor positions.

BRIEF DESCRIPTION OF THE DRAWINGS

The assembly of the present invention has other objects and features of advantage which will be more readily apparent from the following description of the best mode of carrying out the invention and the appended claims, when taken in conjunction with the accompanying drawings, in which:

DETAILED DESCRIPTION OF THE INVENTION

Figure 2:
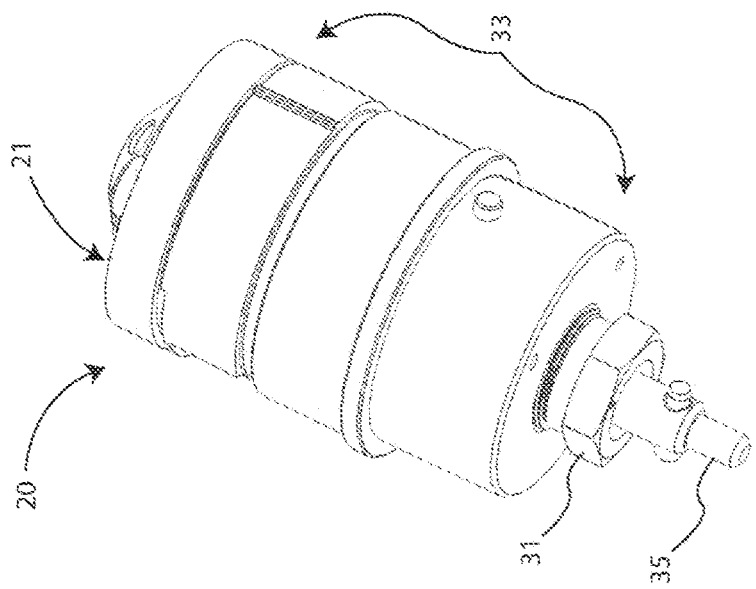
FIG. 2 is a bottom perspective view of the micro-fluidic valve assembly of FIG. 1.
Figure 1:
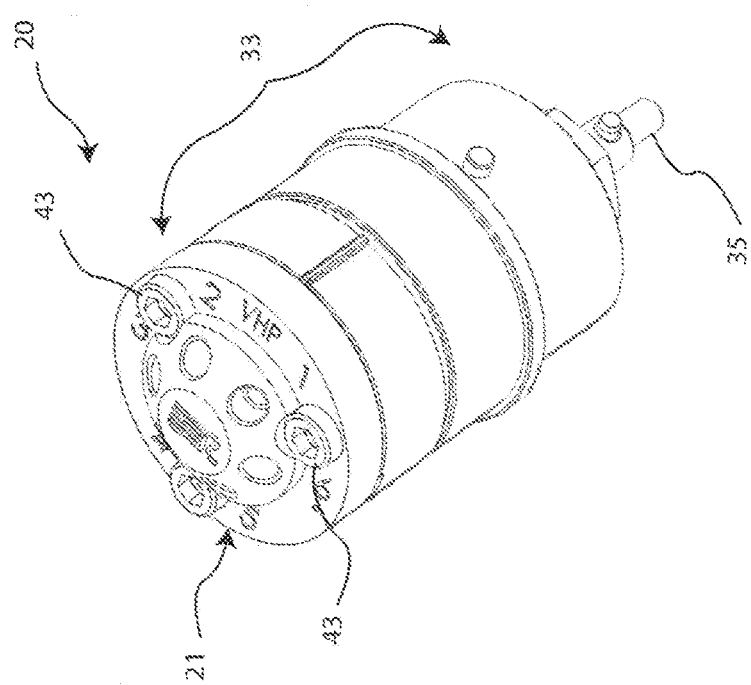
FIG. 1 is a top perspective view of a micro-fluidic valve assembly that incorporates both a metallic rotor element and a metallic stator element designed in accordance with the present invention.
Figure 4:
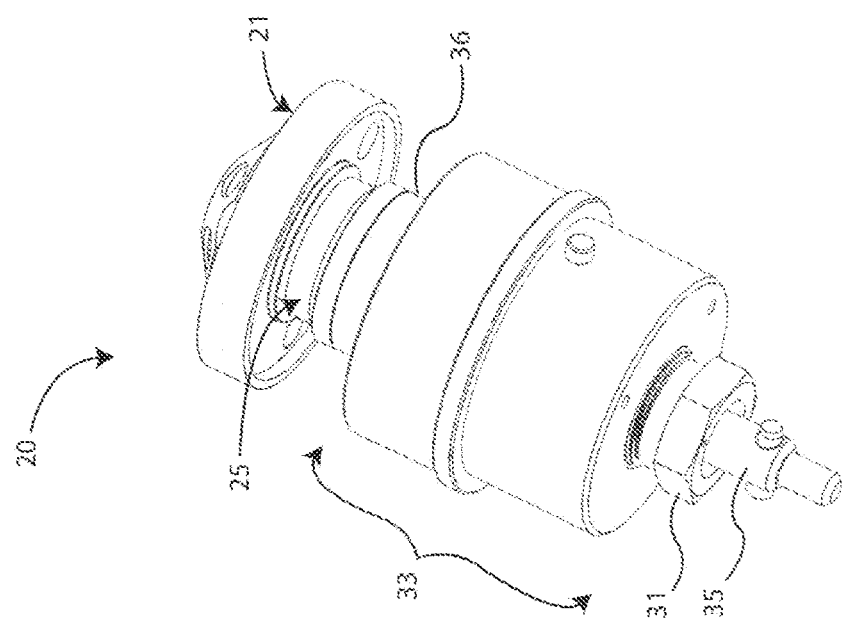
FIG. 4 is a side perspective view of the micro-fluidic valve assembly of FIG. 1, illustrated with the stator ring removed.
Figure 3:
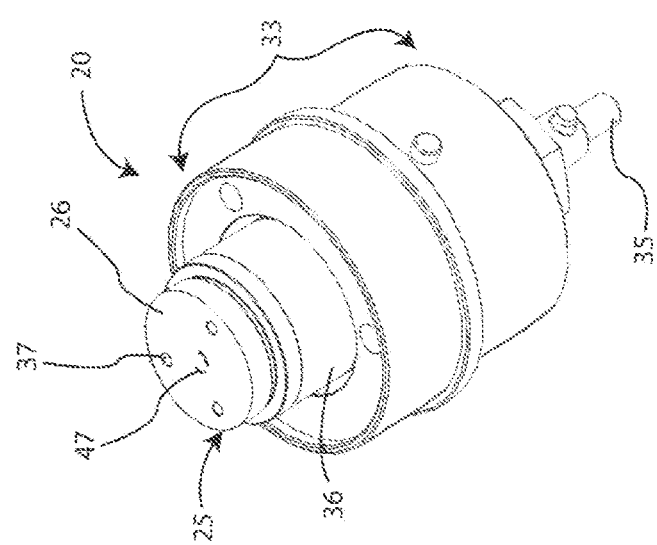
FIG. 3 is a top perspective view of the micro-fluidic valve assembly of FIG. 1, illustrating the rotor element with a stator ring and stator element removed.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Referring now generally to FIGS. 1-8, a rotary shear valve assembly 20 is provided that includes a stator device 21 having a substantially metallic or ceramic, substantially planar stator face 22. The stator device defines at least two or more stator channels in fluid communication with stator face at corresponding stator ports 23. The valve assembly 20 further includes a rotor device 25 having a substantially metallic or ceramic, substantially planar rotor face 26. In accordance with the present invention, a tribological coating is disposed atop at least one of the rotor face and the stator face. Thus, when the rotor device 25 is rotatably mounted about a rotational axis for selective relative rotation between the rotor face and the stator face, at a rotor-stator interface, a fluid-tight seal is formed between the two metallic faces during relative rotation between two or more rotor positions.

Accordingly, due in part to the tribological coating, a metal-on-metal fluid-tight seal is formed at the rotor/stator interface for high pressure applications (i.e., 15 Kpsi to about 25 Kpsi) that is also capable of sustaining high lifecycle capacity (i.e., at least about 75K cycles). Such a tribological coating on at least one of the rotor face and/or stator face enables the formation of a durable fluid-tight and low friction seal under the necessary high pressure compressive pressures between the stator device and the rotor device.

As will be described, at least the rotor face 26 and the stator face 22 are both composed of a relatively rigid material for increased durability under high compression forces. In other configurations, the entire rotor device 25 and the stator device 21 is composed of a substantially rigid material.

Preferably, both the rotor device and the stator device are comprised of metallic compositions such as 316 Stainless Steel, Duplex Stainless Steel, titanium, Alloy Steels or Tool Steel compositions. Other suitable rigid materials, however, have been found that yield similar high pressure ability together with a high lifecycle capacity can be applied, as long as a suitable tribological coating is disposed atop at least one of the rotor face 26 and/or the stator face 22. One such suitable material family is ceramics, for instance, such as Alumina, SSIC, Zirconia. It will be appreciated, however, that whether the rotor and stator is composed of a metal or a ceramic material, that material must be capable of being coated with the tribological material.

Coating of at least one of the stator face and/or the rotor face has been found necessary in these high pressure applications in order to form a fluid-tight, low friction seal at the rotor/stator interface. Due to the substantially rigid material composition of the rotor face and the stator face, for the aforementioned desired reasons, these rigid materials are of course relatively non-compliable.

Such a coating, however, must also exhibit sufficient structural integrity for a high lifecycle under these high fluid pressure, high compressive force conditions. One such suitable and effective coating for pressurized fluid-tight seal formation between opposed rigid surface interfaces, under these conditions, is the tribological coatings. These coatings have been found to exhibit high strength (toughness) and low friction, as well as being resistant to most chemicals used in Liquid Chromatography.

One specific tribological coating that is particularly suitable for this application is the Diamond Like Coatings (DLC), such as the STAR® DLC and BALINIT® DLC provided by Balzers Oerlikon or the aDLC provided by Ionbond. Other tribological coatings that exhibit these characteristics, however, can be applied.

Figure 8:
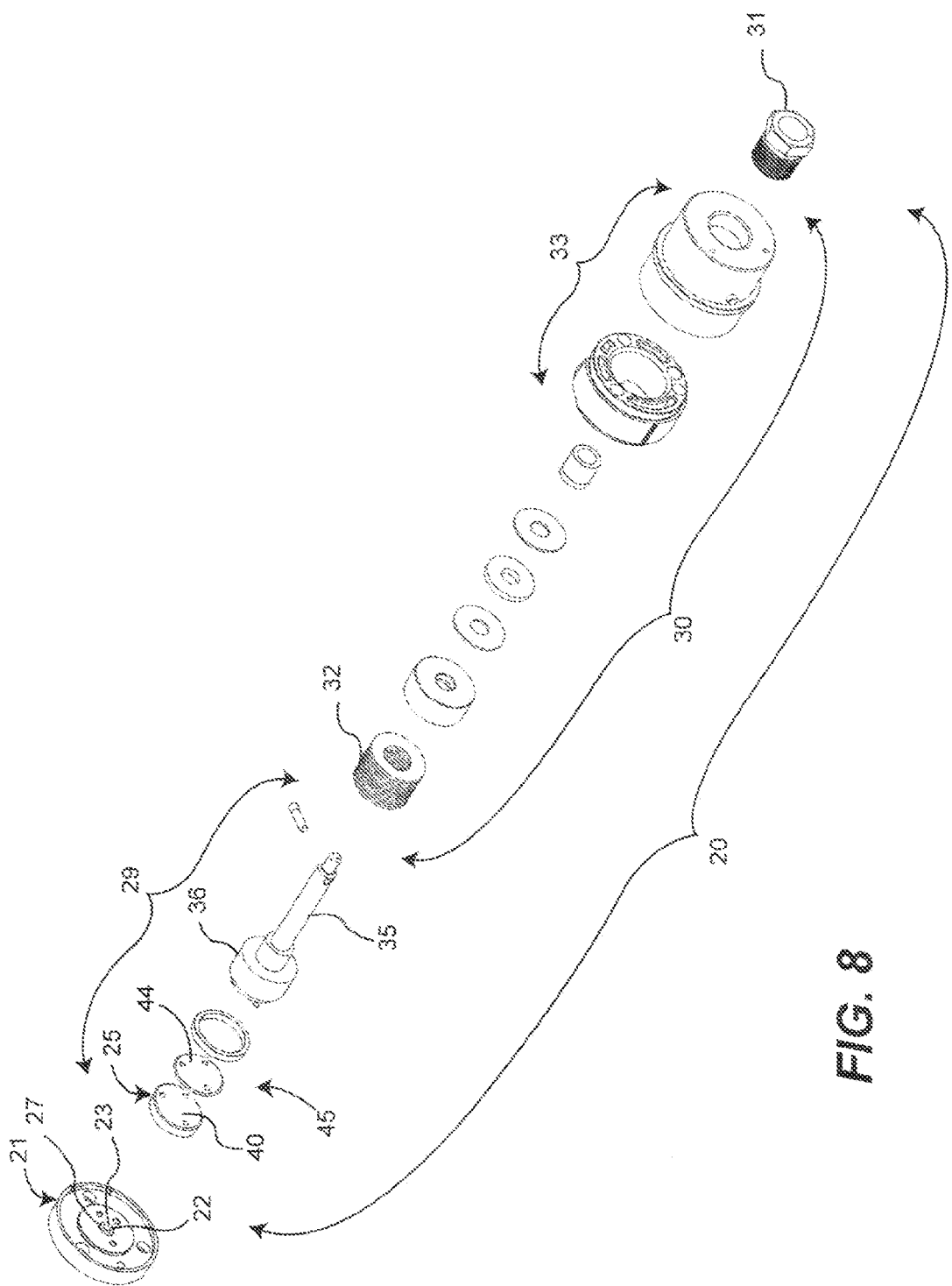
FIG. 8 is a reduced, exploded, bottom perspective view of the micro-fluidic valve assembly of FIG. 1.
Figure 9:
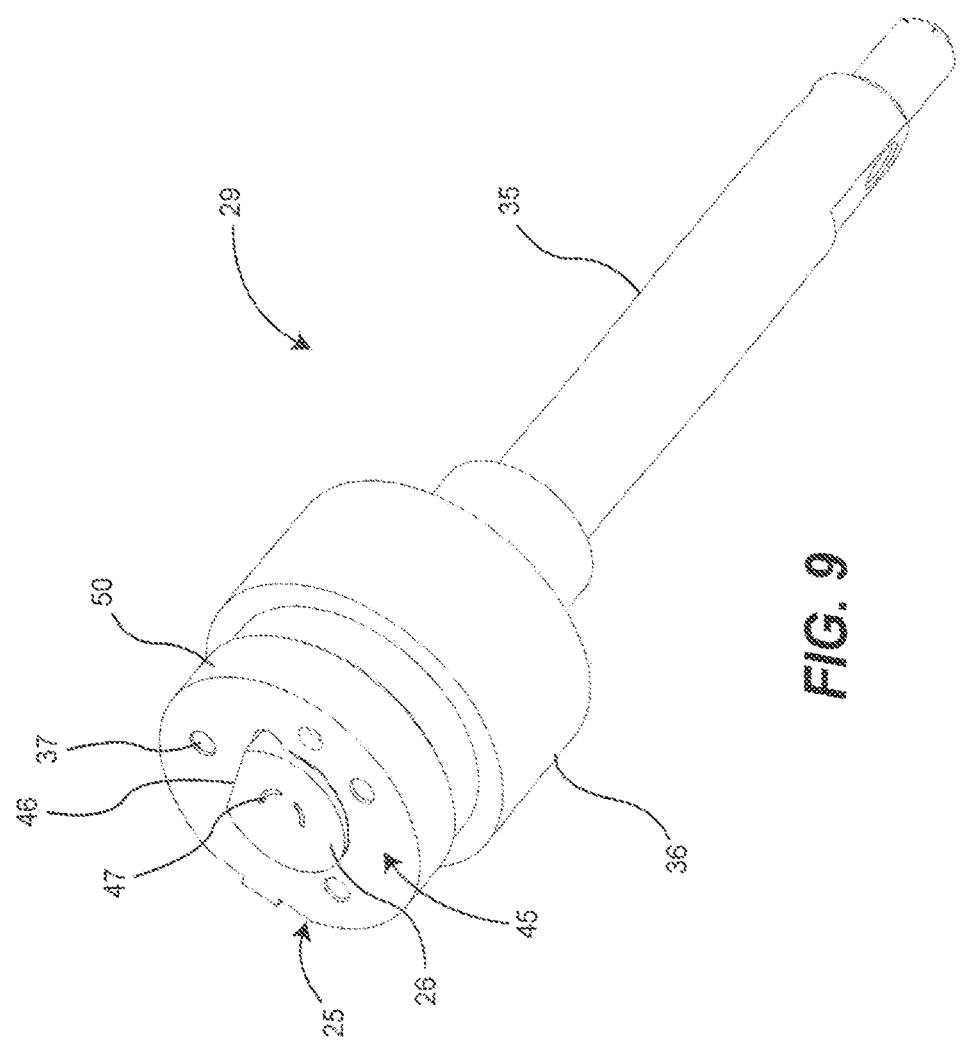
FIG. 9 is a top perspective view of the rotor assembly incorporating an alternative embodiment compliance assembly.

In accordance with the present invention, at least one of, or both, the stator face and the rotor face 26 is coated with the tribological material. In one specific embodiment, in certain conditions, applying the tribological coating to the stator face 22 of the stator boss 27 has been found particularly advantageous to provide a stronger, longer lasting fluid-tight seal at the rotor-stator interface (FIG. 8). For example, for high fluid pressure applications (i.e., greater than about 18 Kpsi, higher axial compression forces between the rotor face 26 and stator face 22 are necessary to maintain a fluid-tight seal. When the valve is set (i.e., when the pressure adjuster nut is adjusted until a rate of decay is achieved, typically this rate is 0.3 uL/min. Fluid pressure is applied to the valve through the stator port(s) rotor seal groove(s). Once the valve holds the required amount of pressure (15-25 Kpsi in this instance) at the 0.3 uL/min leak rate, the valve is "set"), the high pressure applied to the seal by a spring assembly 30 (that includes an adjuster nut 31 and spring washers 32 (FIG. 8)) occasionally causes the coating seal to be indented by the circumferential edge portion of the stator boss 27. Thus, if the rotor face 26 is coated (e.g., the rotor face alone or in combination with the stator face), inconsistent results and damage components have been observed in these instances due to cracking of the coating, or delaminating at the edge portion as the valve is actuated.

It is believed that this indentation causes the coating to "flake-off" or delaminate from the rotor seal in the area of the indentation as the valve is actuated. As this coating is removed, the debris, and possibly the uncoated metal, has been observed to score the remaining coating, degrading the integrity of the coating on the stator boss, and causing the coating on the stator to fail. Once this degradation commences, the fluid-tight seal at the rotor/stator interface will fail in holding pressure.

When only the stator face is coated with the tribological coating, under these high pressure applications, this degradation is not observed. It will further be noted that at lower pressures (3-6 Kpsi), it is believed that both the stator and rotor seal could be coated (DLC or otherwise) and provide a good seal, since hard-on-hard valves work at these pressures. Since these pressures applied to the seal would be lower, the rotor seal is less likely to be indented and cause the coating to fail.

Figure 5:
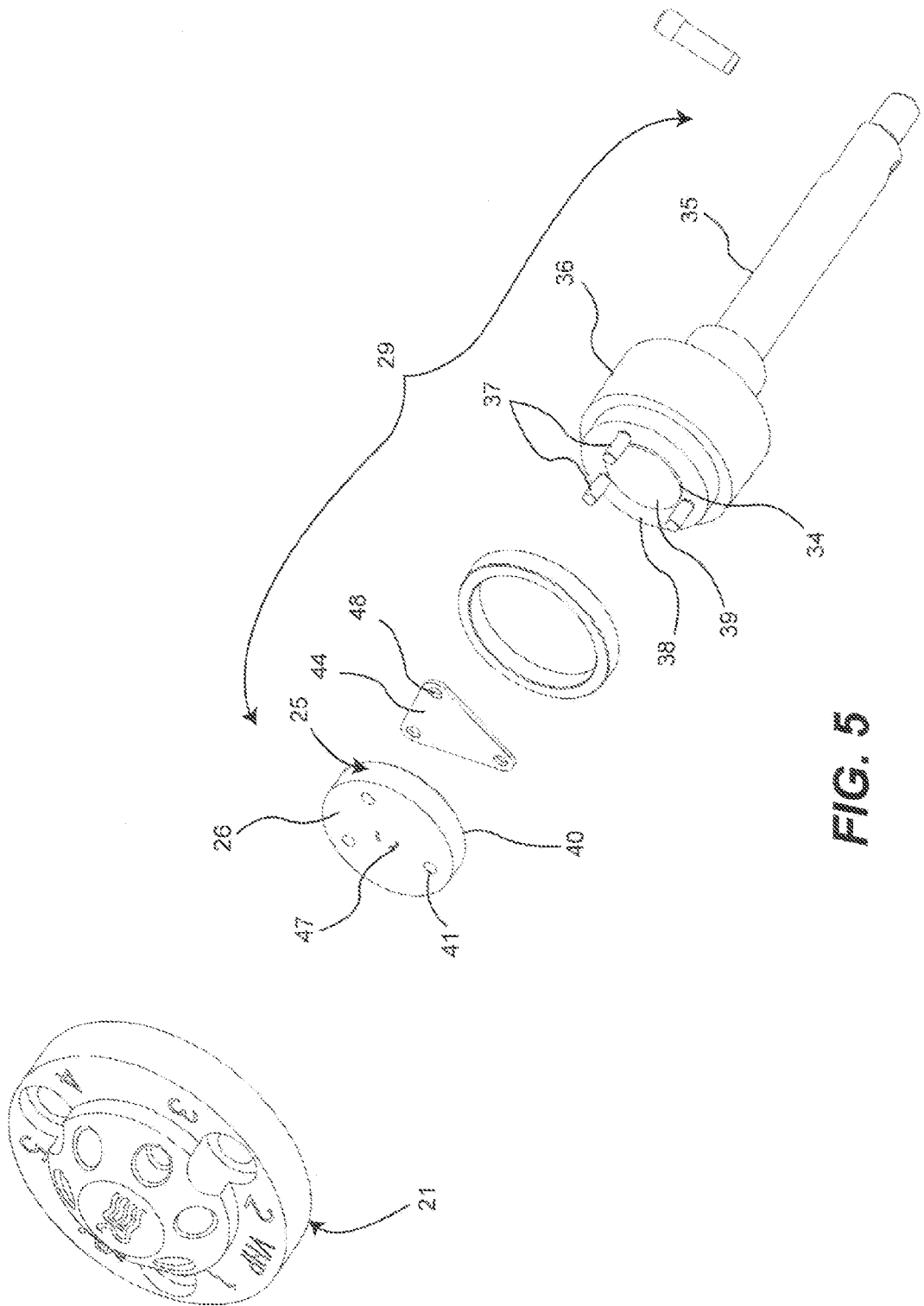
FIG. 5 is an exploded, top perspective view of a rotor assembly and the stator element of the micro-fluidic valve assembly of FIG. 1.

Referring now to FIGS. 1-5 and 8, a typical shear valve assembly 20 is shown and described. Briefly, as best illustrated in FIG. 8, the shear valve assembly typically includes a housing assembly 33 (essentially comprised of a valve housing and a stator ring) upon which a rotor assembly 29 is rotatably disposed therein. The rotor assembly 29 includes a drive shaft 35 and a distally disposed head assembly 36 that is configured to seat the rotor device 25 thereon. To promote force concentration and the ability of the rotor device to pivot atop the head assembly 36, the head assembly includes a raised platform or pad 34 upstanding slightly from a distal surface 38 thereof. This upstanding shaft pad 34 is preferably disk-shaped, having a substantially planar seating surface 39 that is configured to seat directly against a contact surface 40 of the rotor device 25. It will be appreciated, however, that FIGS. 5, 7 and 8 are illustrated with a thin compliant element or shim member 44 disposed there between which will be described in detail below.

The diameter of this upstanding pad 34 is preferably less than that of the contact surface 40 of the rotor device. However, the diameter is also preferably not less than a range of about 45% that of the rotor device, such that the smaller diameter allows minute teetering of the rotor device so that the rotor face and stator face will be in full contact therebetween. Accordingly, as will be described in greater detail below, the contact surface 40 of the rotor device 25 and seating surface 39 of the upstanding shaft pad 34 need not be in substantially flush contact with one another. In one specific embodiment, the diameter of the upstanding pad may be in the range of about 0.200" to about 0.368", and more preferably about 0.230", while the diameter of the rotor device may be in the range of about 0.600" to about 0.625".

Figure 6:
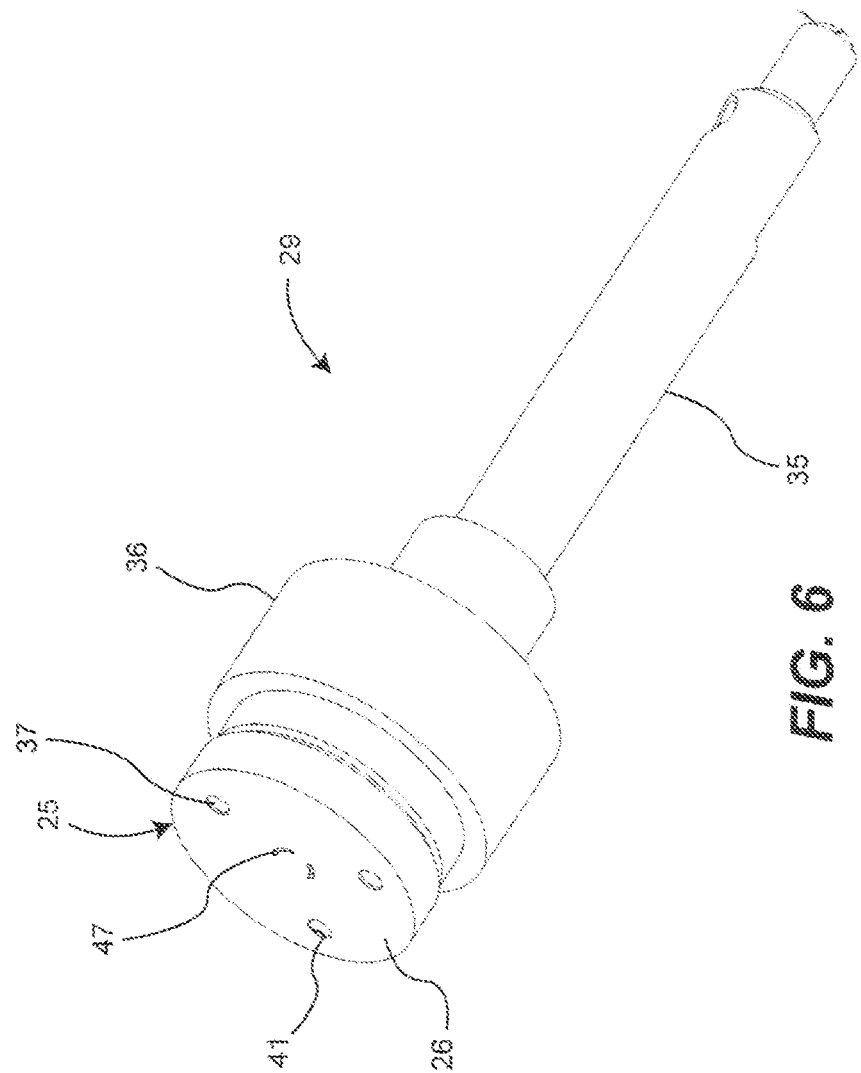
FIG. 6 is an enlarged, top perspective view of the rotor assembly of FIG. 5.
Figure 7:
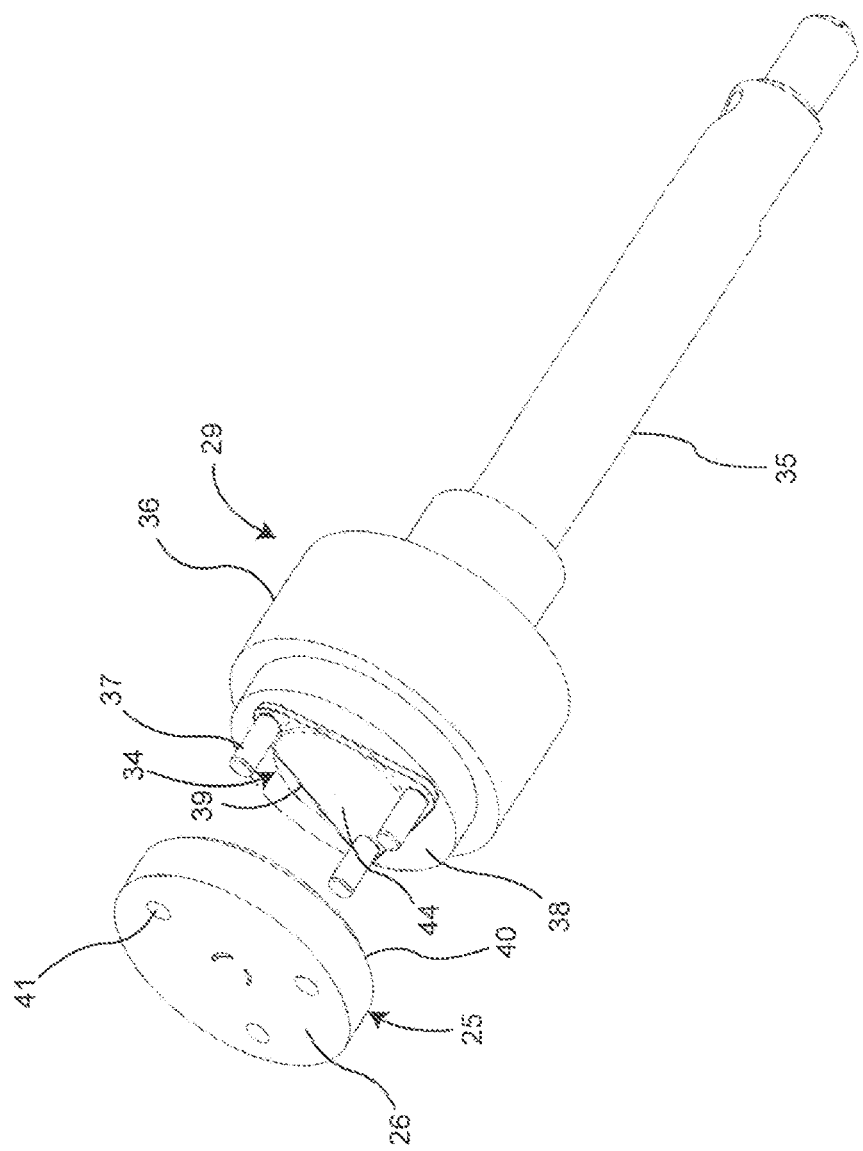
FIG. 7 is a partially exploded, top perspective view of the rotor assembly of FIG. 6, incorporating a compliance assembly constructed in accordance with the present invention.

In a typical configuration, three strategically oriented dowel pins 37 extend distally from the distal surface 38 of the head assembly 36 (FIGS. 5-7). These dowel pins 37 are slideably received in corresponding through-holes 41 in the disk-shaped rotor device 25 that function to mount and align the rotor device 25 relative to the drive shaft 35. Furthermore, these dowel pins 37 enable torque transfer, and thus, rotation of the rotor device 25 as the drive shaft 35 is rotated about the rotational axis.

The stator device 21 is mounted to a distal portion 42 of the housing assembly 33, via nuts 43, in a manner positioning the stator face 22 of the stator boss adjacent to and in contact with the rotor face 26 of the rotor device 25. To generate the compressive force between the rotor device 25 and the stator device 21, at the rotor-stator interface, the spring assembly 30 is cooperates between the housing assembly 33 and the head assembly of the drive shaft 35. Briefly, a pressure adjuster nut 31 is threadably mounted to the proximal portion of the housing assembly 33. As the distal end of the pressure adjuster nut compresses a spring stack (i.e., the stack of spring washers 32) against the head assembly 36 the rotor device 25 is compressively urged against the stator boss 27. Newer microfluidic valves have recently been developed that incorporate pressure adjuster assemblies for ultra-high pressure fluid applications that offer significant valve rebuild advantages. These assemblies are disclosed in our U.S. patent application Ser. No. 12/815,265 to Tower et al, filed Jun. 14, 2010, now issued U.S. Pat. No. 8,627,851, and entitled "REBUILDABLE MICRO-FLUIDIC VALVE ASSEMBLY", which is incorporated by reference in its entirety.

Referring now to FIGS. 3-7, and in accordance with the present invention, both the stator device 21 and the rotor device 25 are composed of a metallic material, forming a metal-on-metal stator-rotor interface. The tribological coating (preferably a DLC) isolates true metal-to-metal contact, of course, functioning to form a fluid-tight seal under higher pressure situations. As indicated above, for applications greater than about 15 Kpsi, the stator face 22 is preferably coated, while for applications ranging from about 3 Kpsi to less than about 6 Kpsi, either the stator face 22, the rotor face 26 or both faces can be coated.

In this coated, metal-on-metal configuration, due to the rigidity and hardness of these shear face valve components, it is highly beneficial to orient the substantially planar faces of the stator device and the rotor device substantially parallel to one another. However, while such substantially parallel orientation is attainable, this may be cost prohibitive, and thus not be practical. Due to the collective stack up of component tolerances, the metal rotor face 26 may not seal flatly or substantially parallel and flush to the substantially planar stator face, or the stator may not be perfectly planar in the first place.

Therefore, in accordance with another aspect of the present invention, the rotor assembly 29 incorporates a rotor face compliance assembly 45 that cooperates with the substantially planar rotor face 26 to orient it substantially parallel to the stator face 22. The compliance assembly 45, for example, includes a compliant element (e.g., a shim member 44 of the embodiment of FIGS. 5-8, or a support device 50 of the embodiment of FIGS. 9-13) disposed between the head assembly 36 and the rotor device 25 (or at least metallic or ceramic portion thereof, such as the rotor element 46 of the embodiment of FIGS. 9-13) that is compressible in a manner enabling the substantially planar rotor face 26 to orient substantially parallel to the stator face 22. In one particular embodiment, as above-mentioned, the compliant element is provided by a compliant shim member 44 disposed between the distal seating surface 39 of the raised platform 34 and the contact surface 40 of the rotor assembly 29. Hence, upon compression of the head assembly 36 against the rotor device 25, and thus, compression of the rotor face against the stator face, the substantially more compliant shim 44 will be caused to compress in a manner that seats the rotor face more flush and parallel against stator face. As mentioned above, thus, the need for a completely flush seat between the contact surface 40 of the rotor device 25 and the seating surface 39 of the upstanding shaft pad 34 is not as necessary to ensure a flush, sealed contact between the rotor face and the stator face.

The diameter of the shim member 44 is preferably less than that of the contact surface 40 of the rotor device 25, but must incorporate through-holes 48 that are strategically aligned to receive and cooperate with the dowel pins 37 that extend distally from the distal surface 38 of the head assembly 36 (FIGS. 5-7). Similar to the rotor device 25, these dowel pins 37 are slideably received in the corresponding through-holes 48 in the shim 44 to mount, secure and align the shim 44 relative to the head assembly 36.

As best shown in FIGS. 5, 7 and 8, the shim may be comprised of many different shapes. For instance, the shim may be a conventional circular shape (FIG. 8), or may be an efficient, minute triangular shape (FIGS. 5 and 7).

The material composition of the shim 44 should have sufficient structural integrity to withstand the substantial compressive forces applied between the rotor device and the stator device. However, the material must also be sufficiently compliable to enable the rotor face to seat substantially flush against the stator face, during operative compression. The compressive modulus, k, for instance, is preferably in the range of about 250 to about 300 kpsi. In one particular embodiment, the material composition of the shim 44 may be comprised of Polyethylene Terephthalete Glycol (PETG) or Polyester or Polycarbonate, having a thickness in the range of about 0.010" to about 0.040".

Figure 10:
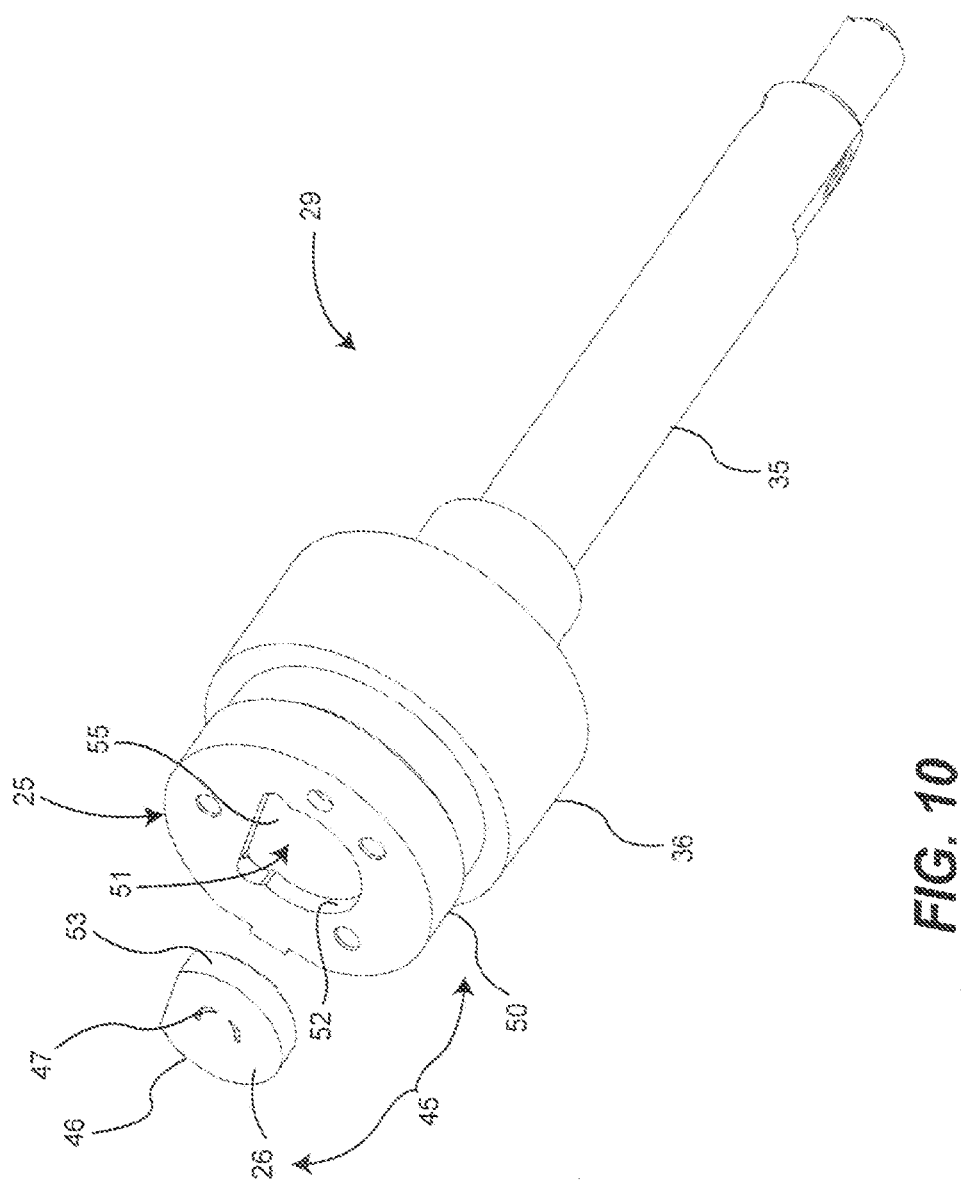
FIG. 10 is a partially exploded, top perspective view of the rotor assembly and compliance assembly of FIG. 9.
Figure 11:
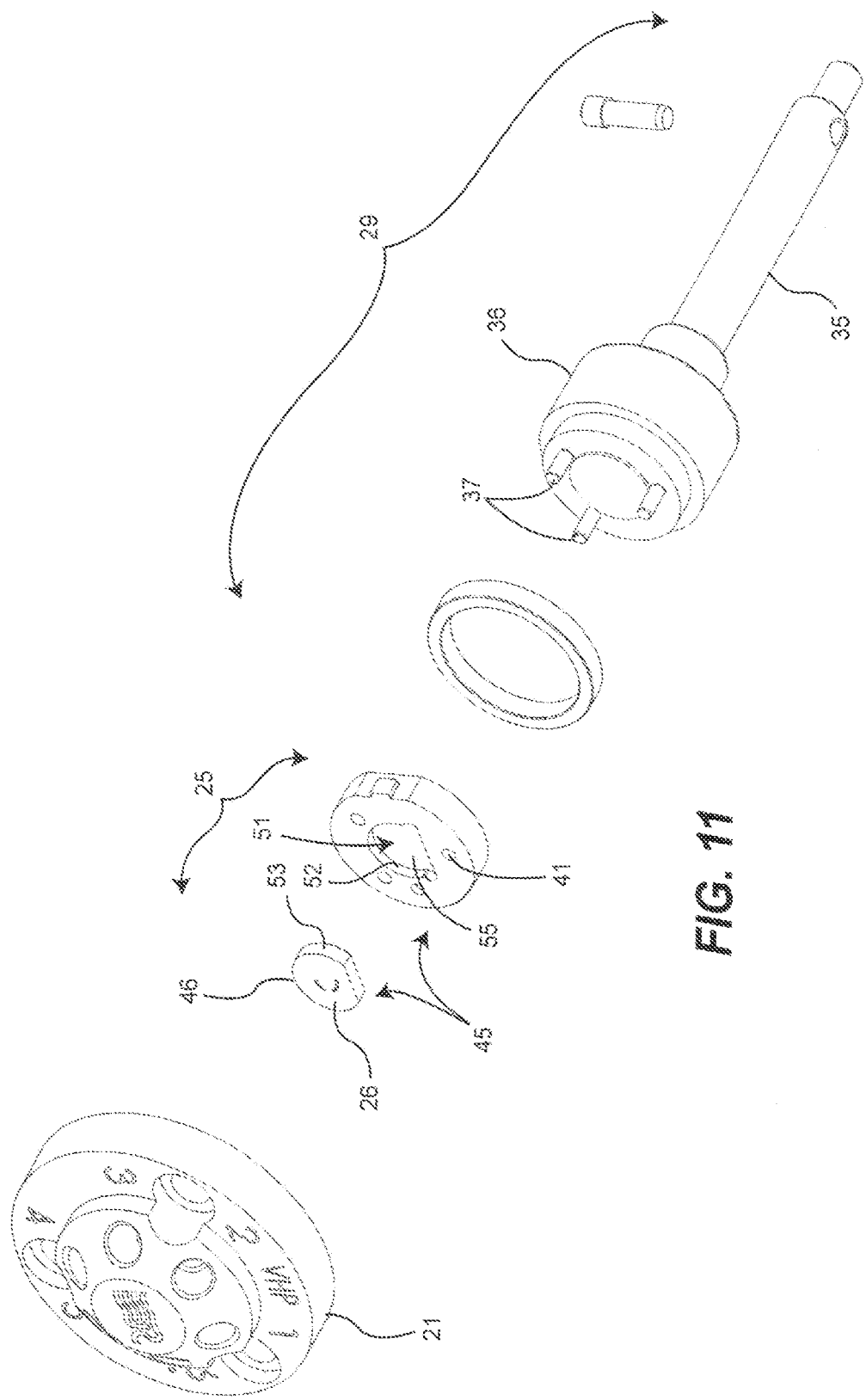
FIG. 11 is an exploded, top perspective view of the rotor assembly and compliance assembly of FIG. 9, together with the stator element.
Figure 12:
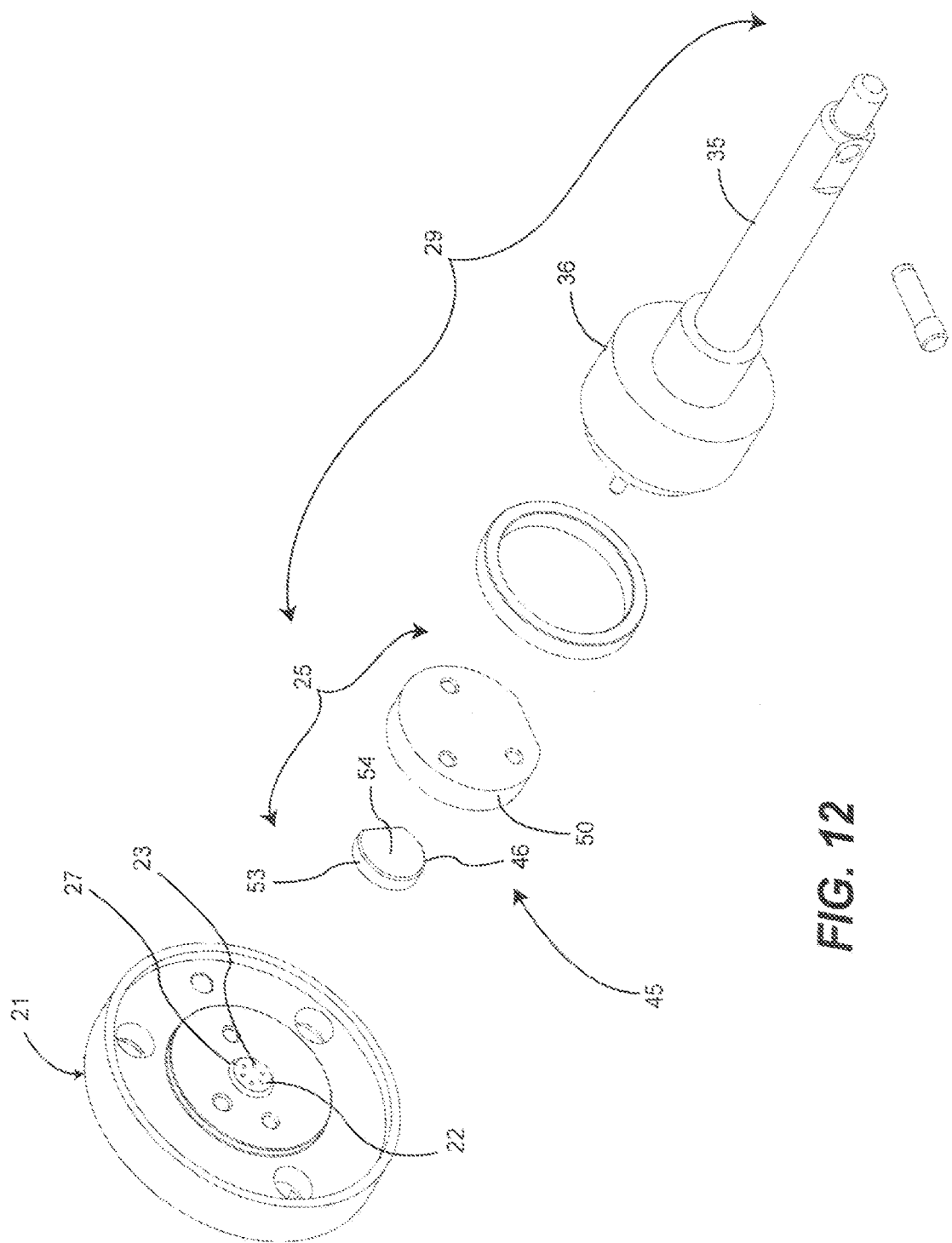
FIG. 12 is an exploded, bottom perspective view of the rotor assembly and compliance assembly of FIG. 10.

In another specific embodiment of the compliance assembly 45, as illustrated in FIGS. 9-12, the rotor device 25 is comprised of a metallic or ceramic (insertable) rotor element 46 that is received and supported by a compliant support device 50. In this embodiment, the support device 50 functions as the compliant element, and thus, provides a compliant backing against the back side (i.e., the proximal face) of the inserted rotor element 46. FIGS. 10-12 best illustrate that the metallic rotor element 46 is preferably disk-shaped having the distal facing, substantially planar rotor face 26 containing the rotor grooves 47.

The support device 50 is for the most part is shaped similar to a typical rotor device 25, such as that in the embodiment of FIGS. 5-7. The distal face of the support device, however, defines a receiving socket 51 with a peripheral interior sidewall 52 formed and dimensioned for press-fit receipt of the outer circumferential or peripheral wall 53 of the rotor element 46 until a proximal face 54 thereof contacts and is supported by the distal socket face 55 of the receiving socket 51.

By providing a compliant backing material, at least in the axial direction, upon the application of a compressive force between the rotor device 25 and the stator face 22, the contacting surfaces of the support device 50 should have some compliance or compression. Such compressive compliance allows the substantially planar rotor face 26 to slightly relocate to an orientation that is substantially parallel to the substantially planar stator face. In other words, the compliant material will "move" or compress, due to contact with the backside contact surface of the metal rotor element, allowing the polymer to absorb any misalignment between the rotor face and the stator face of the stator boss. The rotor face 26 can then seal and mate flat against and substantially parallel to the stator boss face 22.

Figure 13:
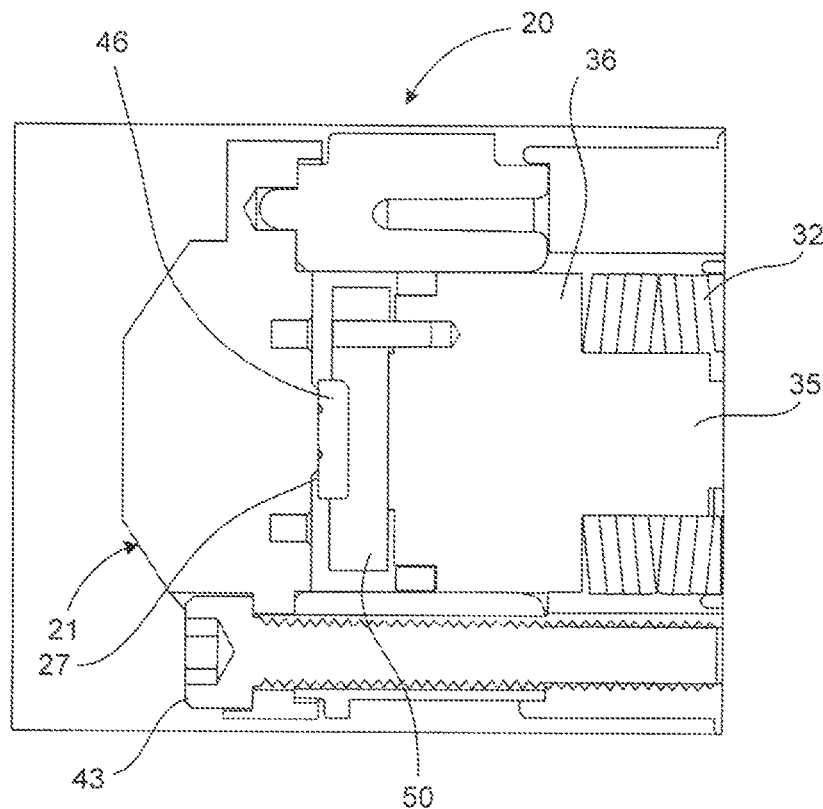
FIG. 13 is an enlarged, fragmentary, side elevation view, in cross-section, of the micro-fluidic valve assembly of FIG. 1, incorporating the compliance assembly of FIG. 9.
Figure 14:
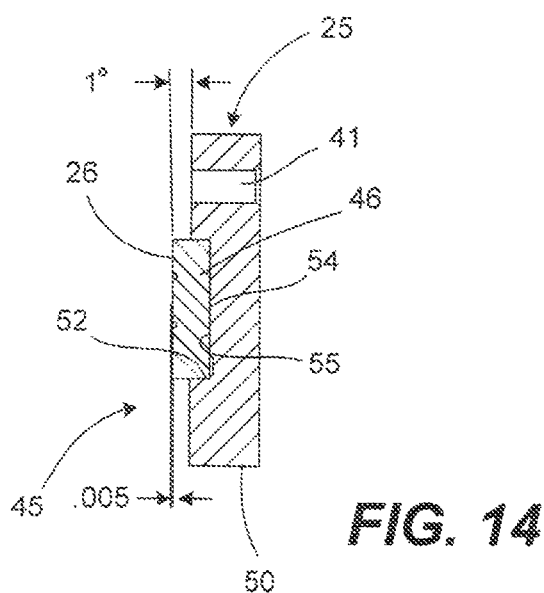
FIG. 14 is a side elevation view, in cross-section, of the compliance assembly of FIG. 13.
Figure 15:
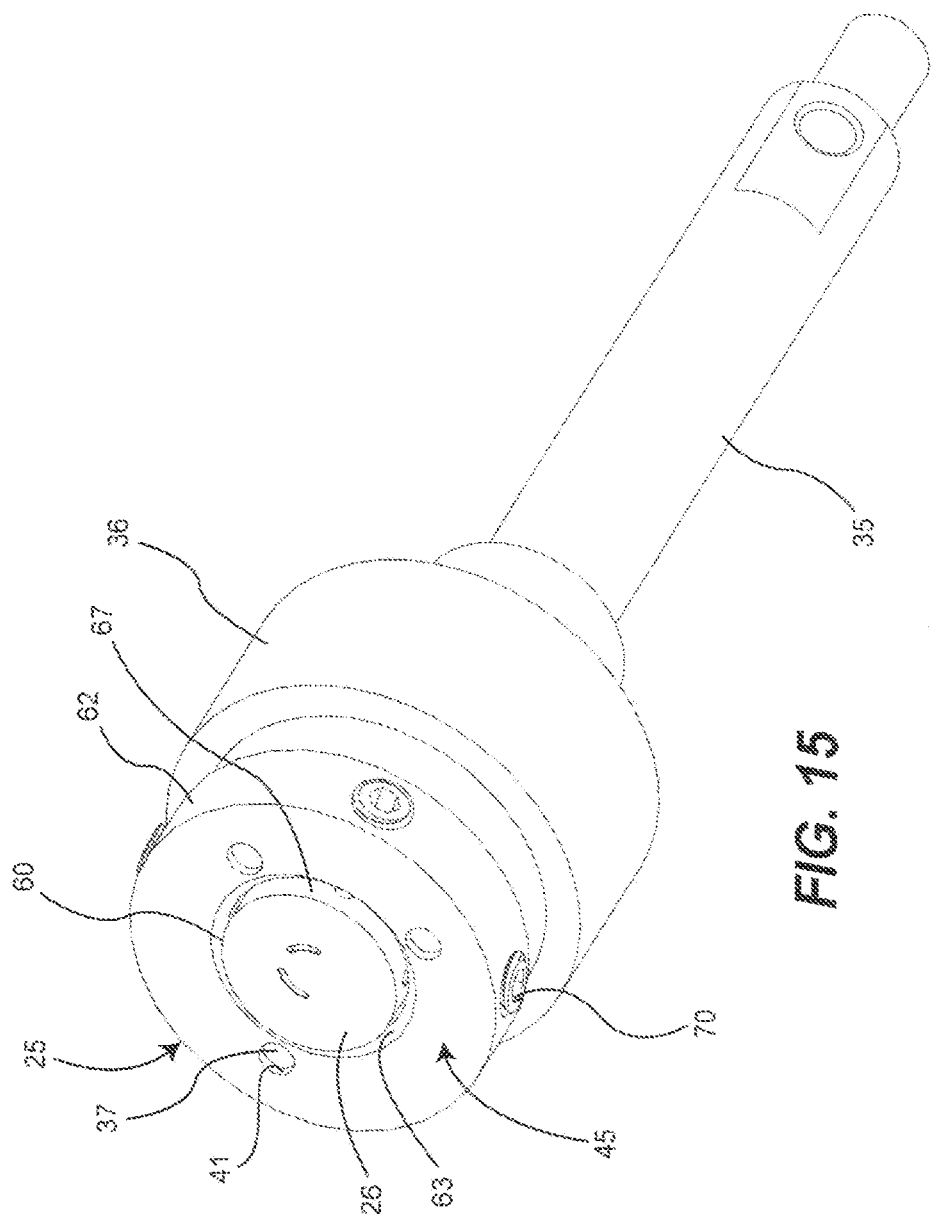
FIG. 15 is a top perspective view of the rotor assembly incorporating another alternative embodiment compliance assembly.

In one specific embodiment, the support device 50 is preferably about 0.100" to about 0.200" thick, has a compressive modulus, k, in the range of about 400 to about 500 kpsi, and is composed of a polymer material exhibiting high tensile and compressive strength. Such a compliant material exhibiting these other properties, permits minute compliance, while further permitting transfer of the high compressive forces in the axial direction to the rotor face 26 of the rotor element 46. As best illustrated in FIGS. 13 and 14, compliance on the order of about 1° or about 0.005" at the circumferential edges of the rotor element is attainable.

The polymer material used can be changed for a variety of applications. Depending upon whether the application is for the lower region of what is considered a high lower pressure application (e.g., 3-6 Kpsi), a softer unfilled polymer, such as polyetheretherketone (PEEK) material or Nylon, may be applied. In contrast, for higher pressure applications (e.g., 15-25 Kpsi), a carbon filled polymer material may be necessary which significantly increases the polymers tensile and compressive strength.

One such high strength polymer support material is an engineered blend of (PEEK) with carbon fibers (e.g., a 20%-30% carbon (PEEK). This polymer material is carbon filled, yielding the requisite high tensile and compressive strength. Thus, due to the high pressures of the spring washers 32 needed to seal the valve, this (PEEK) blend is currently the preferred material. It will be appreciated, however, that other polymer based materials, or even a higher strength elastomer could be used.

Turning now to FIGS. 10 and 11, the disk-shaped rotor element 46 is generally keyed. Not only does this aligned the rotor face 26 relative to the drive shaft 35, but also functions to facilitate torque transfer to the rotor element during the rotation of the support device 50. For ease of machining, the rotor element 46 is "D" shaped and the female receiving socket 51 is a modified "D" shape where the corners of the flat have been relieved for the radius of an end mill. The two parts are assembled by using an arbor press. The arbor press press-fits (0.002" press fit) the two parts together. It will be appreciated, of course, that the outer peripheral edges may be any shape that enables the metal seal insert to press-fit into the polymer backing.

Referring now the embodiment of FIGS. 16-24, the rotor assembly 29 incorporates an alternative embodiment rotor face compliance assembly 45 that enables the rotor face to "rock" and/or "pivot" to an orientation that allows the opposed rotor face and stator face to seal and mate flushly against one another on the stator boss 27.

In this configuration, in a simplified description, a disk-shaped metallic rotor element 60 (similar to that provided the embodiment of FIGS. 16 and 20-23) is pivotally seated atop a ball bearing 61, which in turn, is seated atop a distal end of the head assembly 36 of the drive shaft 35. Accordingly, as a compressive force is applied to the drive shaft 35, the force is transferred, via the ball bearing 61, to the rotor element 60. Upon increasing pressure between the adjacent, and opposed contact, at the rotor/stator interface, the rotor element 60 is caused to minutely rock or pivot in an effort to reorient and align the rotor face substantially parallel to the stator face.

Figure 16:
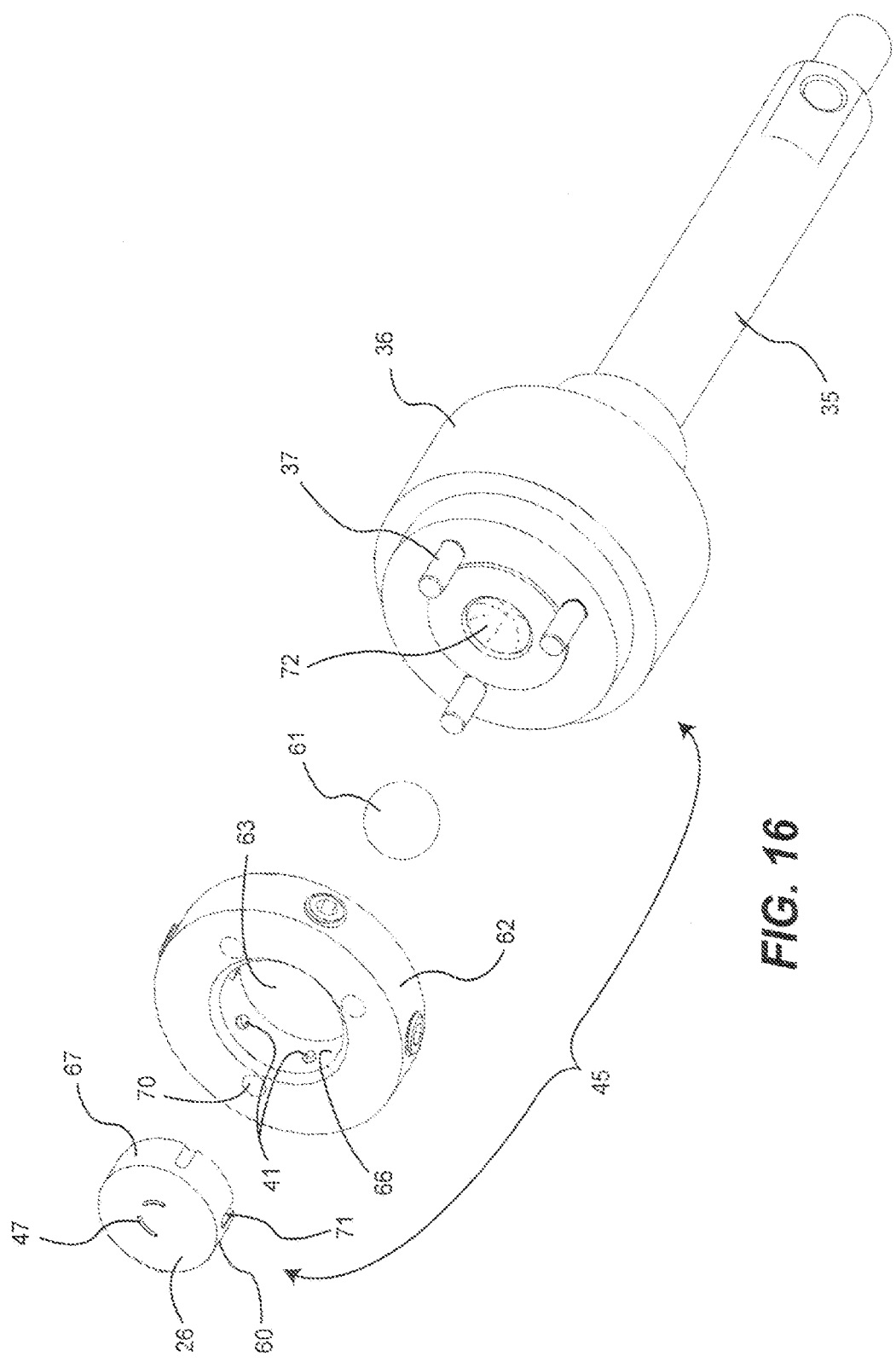
FIG. 16 is an exploded, top perspective view of the rotor assembly and compliance assembly of FIG. 15.
Figure 17:
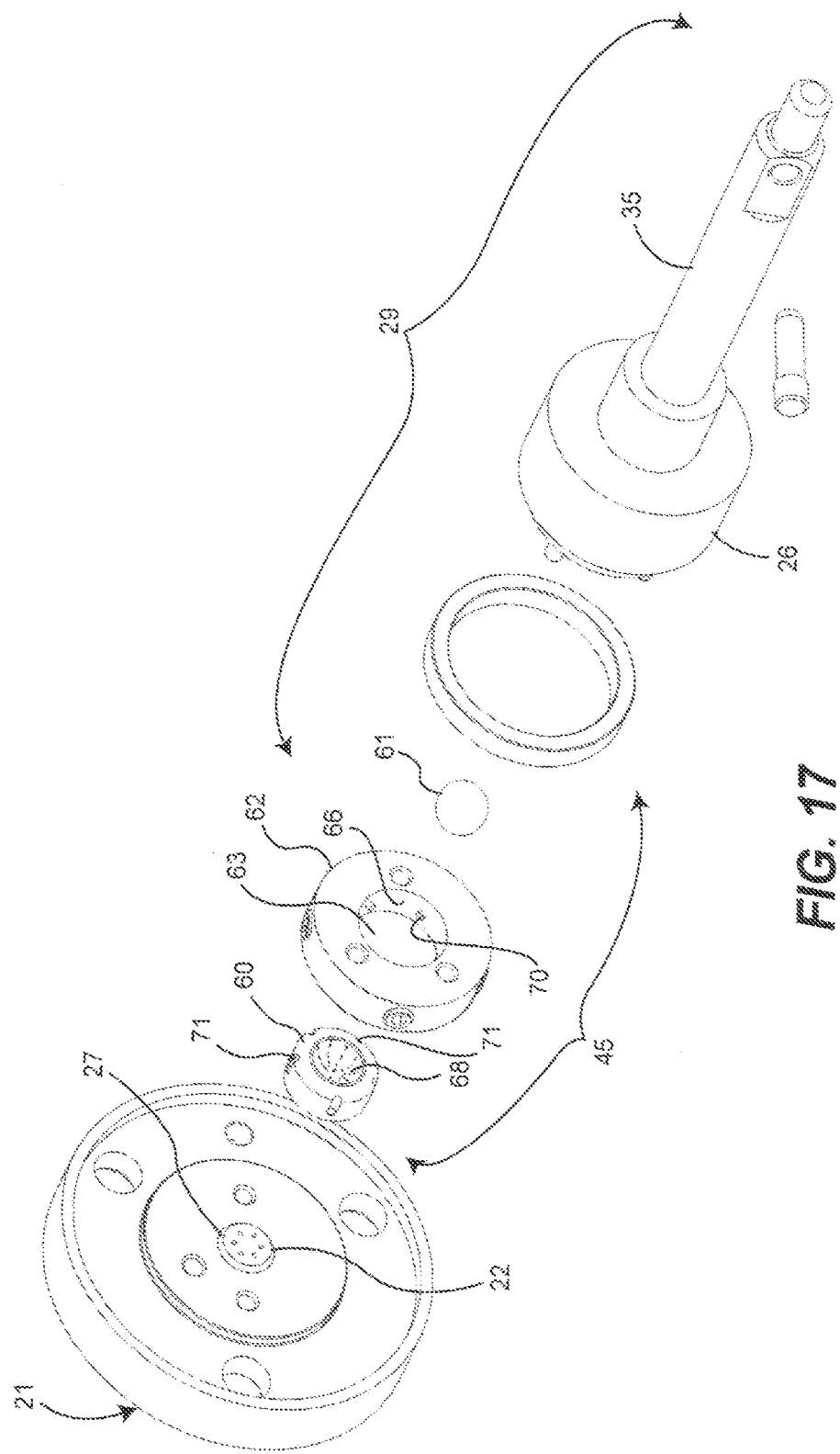
FIG. 17 is an exploded, bottom perspective view of the rotor assembly and compliance assembly of FIG. 15.

To facilitate support of the pivoting rotor element 60, a drive ring 62 is provided that is also shaped similar to the conventional rotor device it replaces. FIGS. 16 and 17 best illustrate that this drive ring includes an axially extending receiving aperture 63 formed for axial receipt of the rotor element 60 in a manner allowing the insert to "float" axially therein, while at the same time securing the rotor element rotationally to the drive ring 62 for rotation about the rotational axis.

Accordingly, the inner diameter of the inner sidewall 66 that defines the receiving aperture 63 is slightly larger than the diameter of the outer circumferential wall 67 of the rotor element 60 to permit minute pivotal movement thereof. The clearance, for example, between the outer diameter of the seal insert and the inner diameter of the drive ring is about 0.020" (0.010" per side). This allows the seal insert to move laterally back and forth within the ring drive 0.010" per side.

To provide seating support atop the ball bearing 61, the proximal facing surface of the rotor element 60 includes a dome-shaped ball socket 68 that is formed, sized and dimensioned to receive a portion of the ball bearing. This configuration is further responsible for providing the pivotal support about ball bearing, and relative to the drive ring 62.

To transfer torque to the axially free floating rotor element 60, as the drive ring 62 rotates about the drive shaft axis, a plurality of guide pins 70 extend radially into the aperture 63 from the inner sidewall 66 of the drive ring 62. These radial guide pins 70 are formed for sliding axial receipt in corresponding elongated receiving slots 71 extending in an axial direction along the outer circumferential wall 67 of the rotor element. Accordingly, as the drive ring is rotated, the guide pins 70 transfer this rotational motion directly to the rotor element.

For precise and accurate rotational displacement and movement of the rotor element, the tolerances between the diameter of the guide pins 70 and the width of the corresponding receiving slots should therefore be relatively small. In one specific embodiment, for example, the tolerance between the diameter of guide pins and the width of the slots is approximately 0.002" (0.001" per side). For instance, if the diameter of the guide pin is selected to be about 0.029"-0.031", then the width of the guide slot 71 in the rotor element should be selected to be in the range of about seal is 0.031"-0.033". Such a relatively small tolerance will enable substantially immediate transfer of the rotation of the drive ring 62, about the drive shaft axis, directly to the rotor element 60. The relative position of the rotor seal grooves 47 relative to the stator ports 23 can therefore be accurately determined.

These radially spaced guide slots 71, however, also extend radially into the outer circumferential wall 67 of the rotor element by a depth slightly greater than the radial length of the guide pins 70. This tolerance permits guide pins 70 to extend slightly into and out of the corresponding guide slots to enable the aforementioned minute lateral movement (on the order of about 0.010" per side) of the rotor device within the drive ring receiving aperture 63. Hence, as the rotor element 60 minutely pivots or rolls about the ball bearing, it also slides along the guide pins 70. This relative axial movement (as well as very minute, relative radial movement) of the guide pins 70 axially along the corresponding receiving slots 71, while also moving minutely laterally within the receiving aperture, enabling the substantially planar rotor face 26 to slightly reorient substantially parallel to the stator face 22. Thus, unlike the polymer backed support device 50 of the embodiments of FIGS. 18-21, the compliance from this pivotal embodiment is provided by the ability of the rotor element seal insert to "move" and "pivot" (i.e., roll) about the ball bearing until the rotor face is reoriented substantially parallel to, and substantially flat against the stator face 22 of the stator boss 27.

These guide pins 70 can be provided by threaded screws (as shown and illustrated) or can be molded or milled during formation of the drive ring 62. Moreover, while five guide pins 70 are shown radially spaced about the inner sidewall 66 of the receiving aperture 63, the compliance assembly 45 could function with only one guide pin and corresponding slot (albeit a more limited compliance). A minimum of three radially spaced guide pins and corresponding guide slots, however, are desired to provide an increased scope of compliance.

An opposed domed-shape socket 72 is also defined by the distal face of the head assembly 36 that is formed to similarly seat against the ball bearing 61. Preferably, this opposed domed-shape socket 72 is provided by an insertable dowel pin 73, press-fit into a corresponding passage 75 at the distal end of the drive shaft 35.

Figure 18:
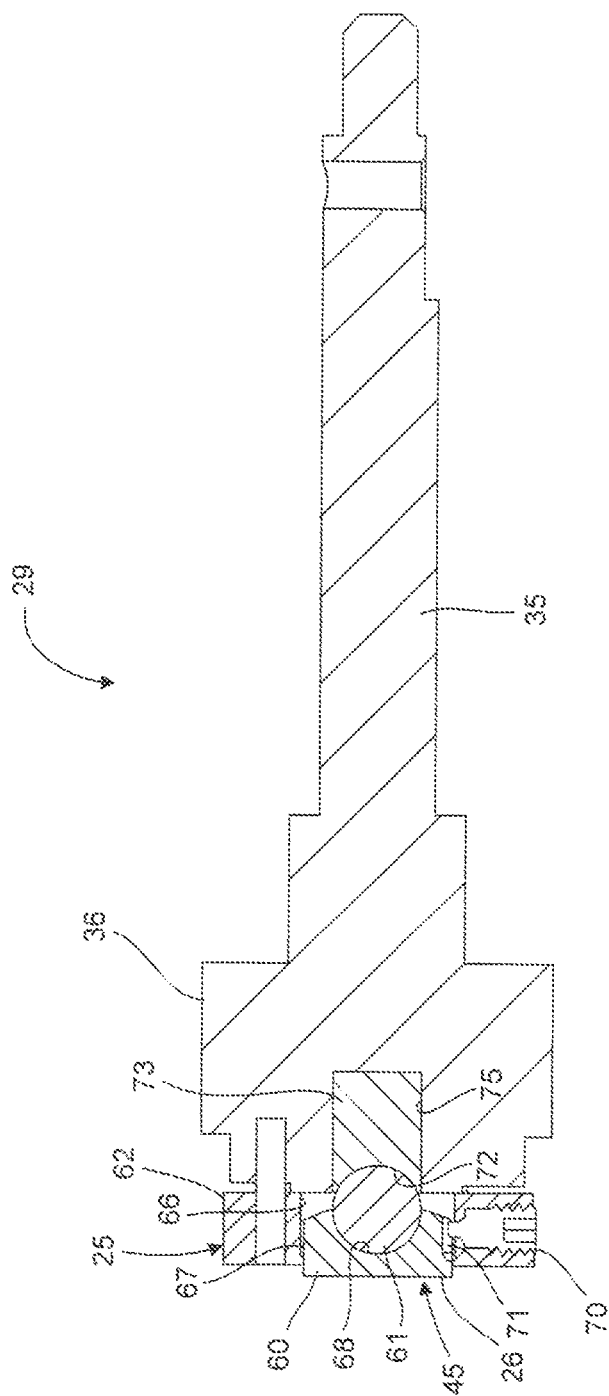
FIG. 18 is a side elevation view, in cross-section, of the rotor assembly and compliance assembly of FIG. 15.
Figure 19:
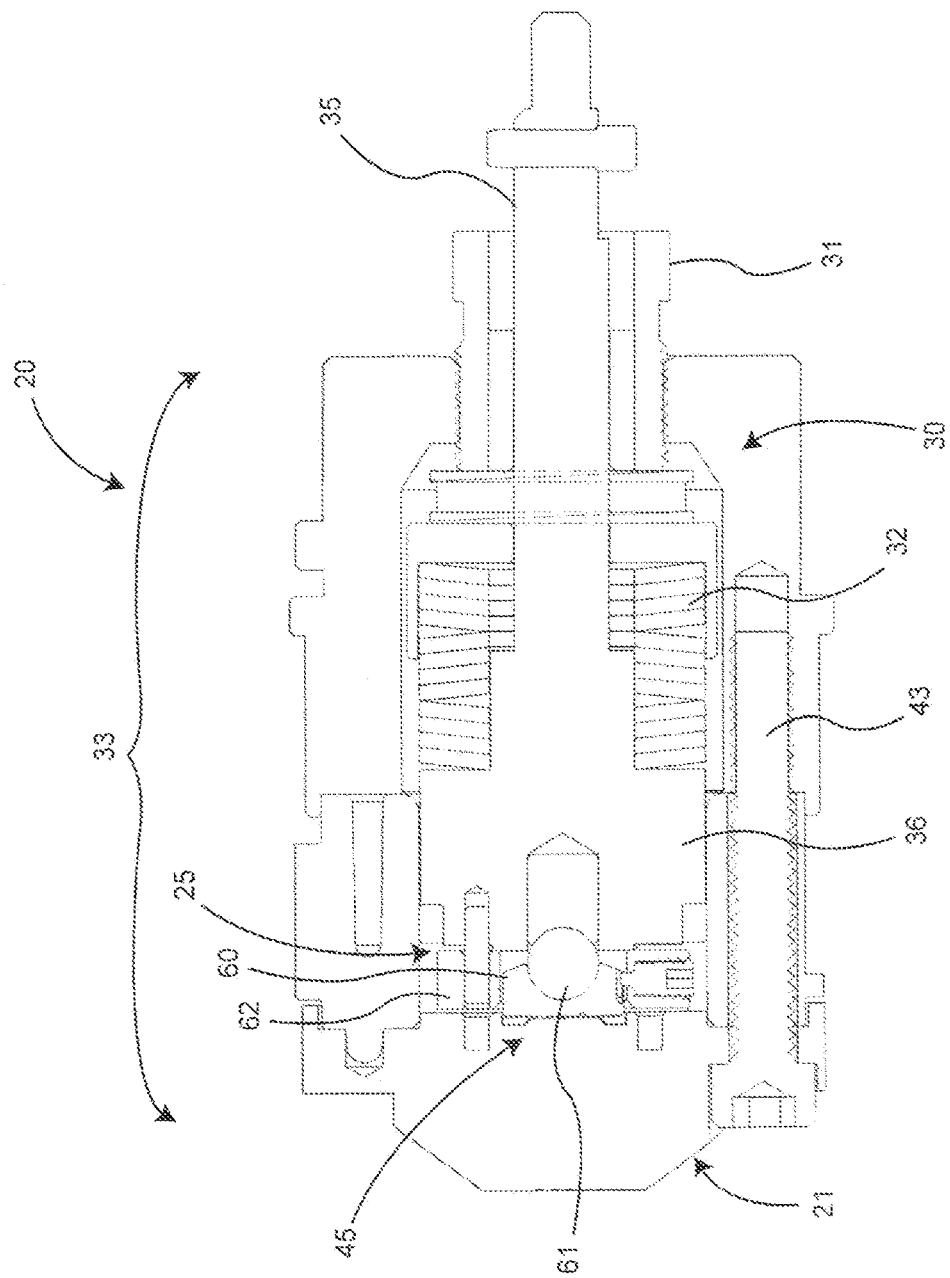
FIG. 19 is a side elevation view, in cross-section, of the micro-fluidic valve assembly of FIG. 1, incorporating the compliance assembly of FIG. 15.
Figure 20:
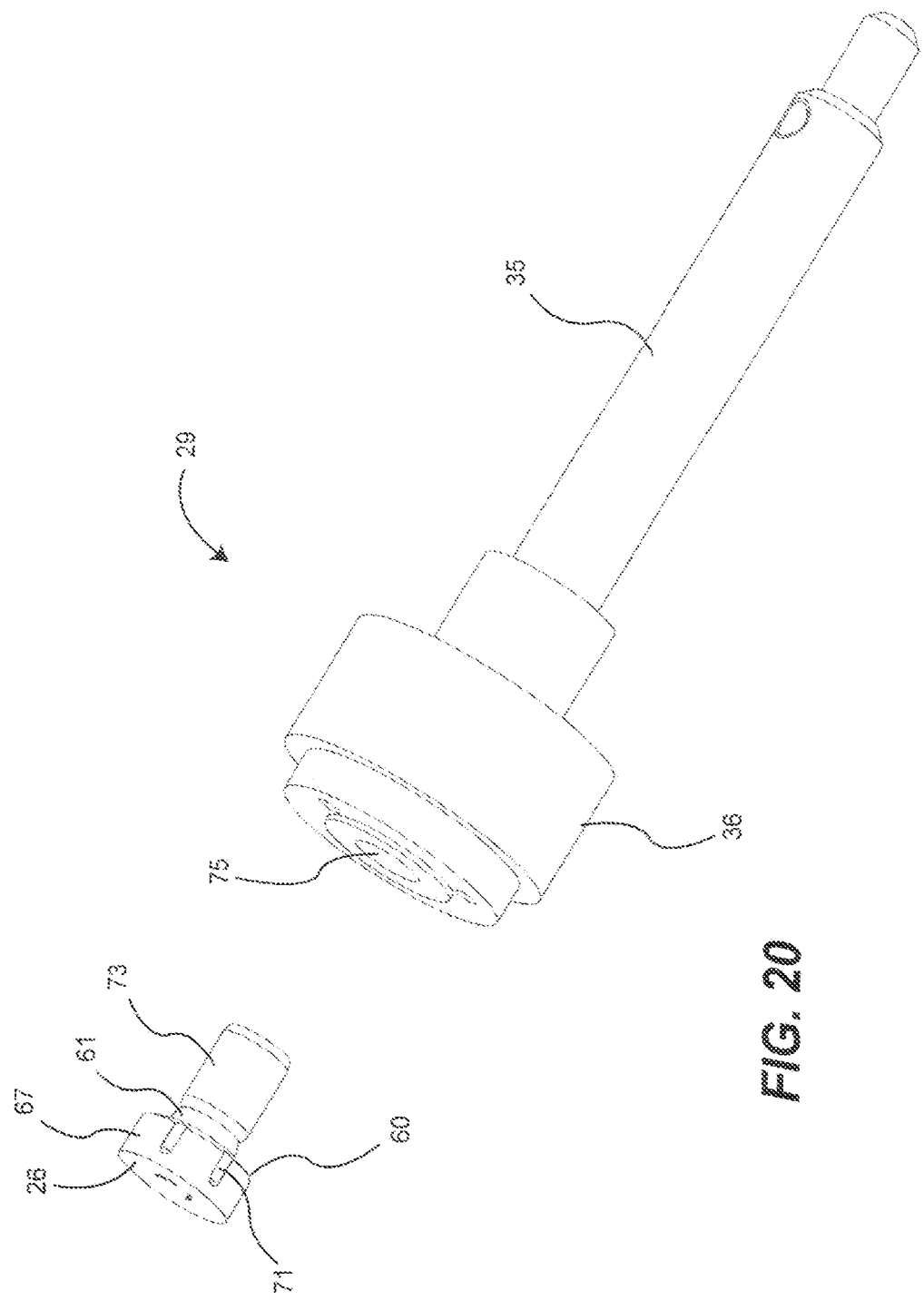
FIG. 20 is a partially exploded, side perspective view of the rotor assembly and compliance assembly of FIG. 15.
Figure 21:
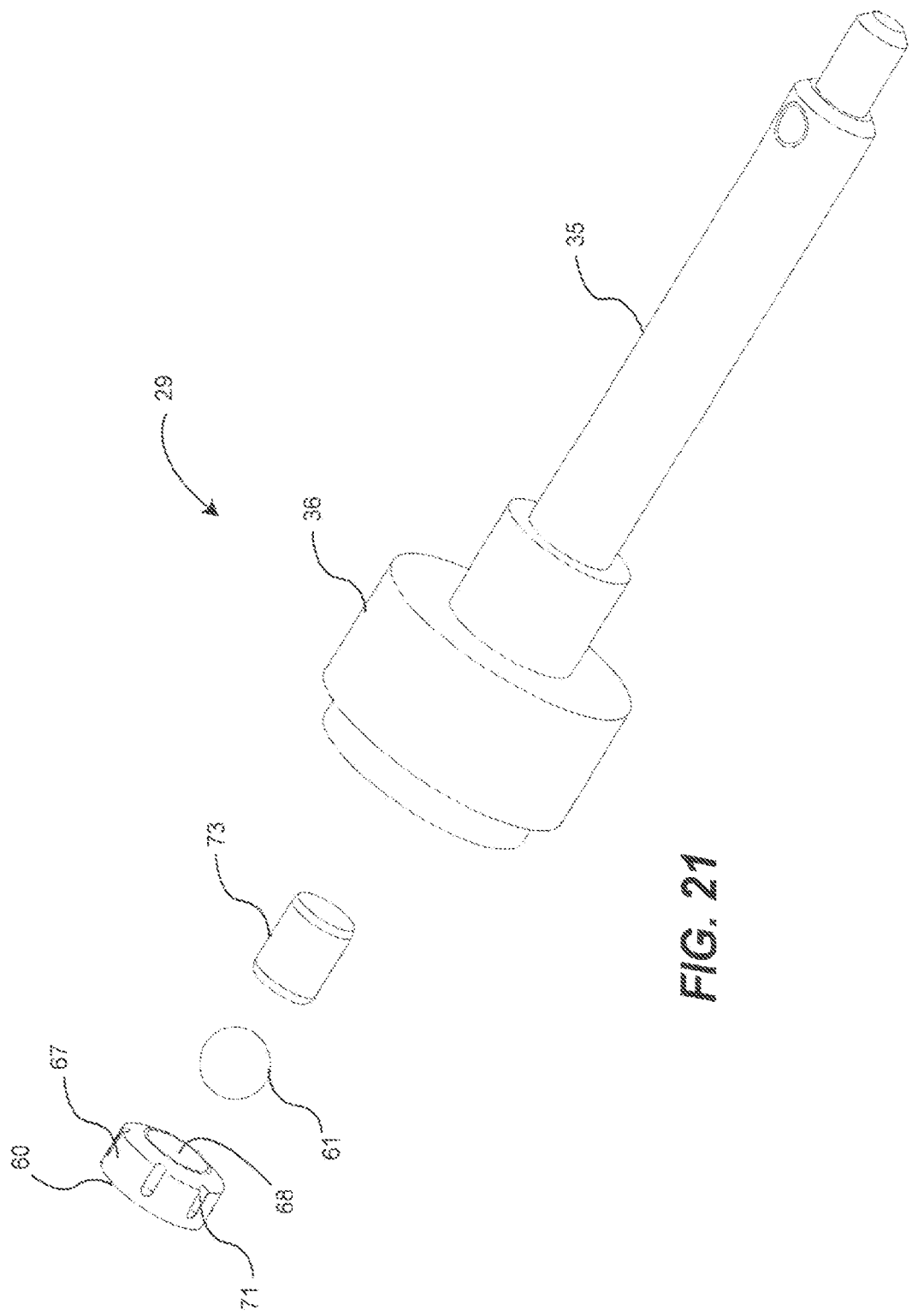
FIG. 21 is an exploded, bottom perspective view of the rotor assembly and compliance assembly of FIG. 15.
Figure 22:
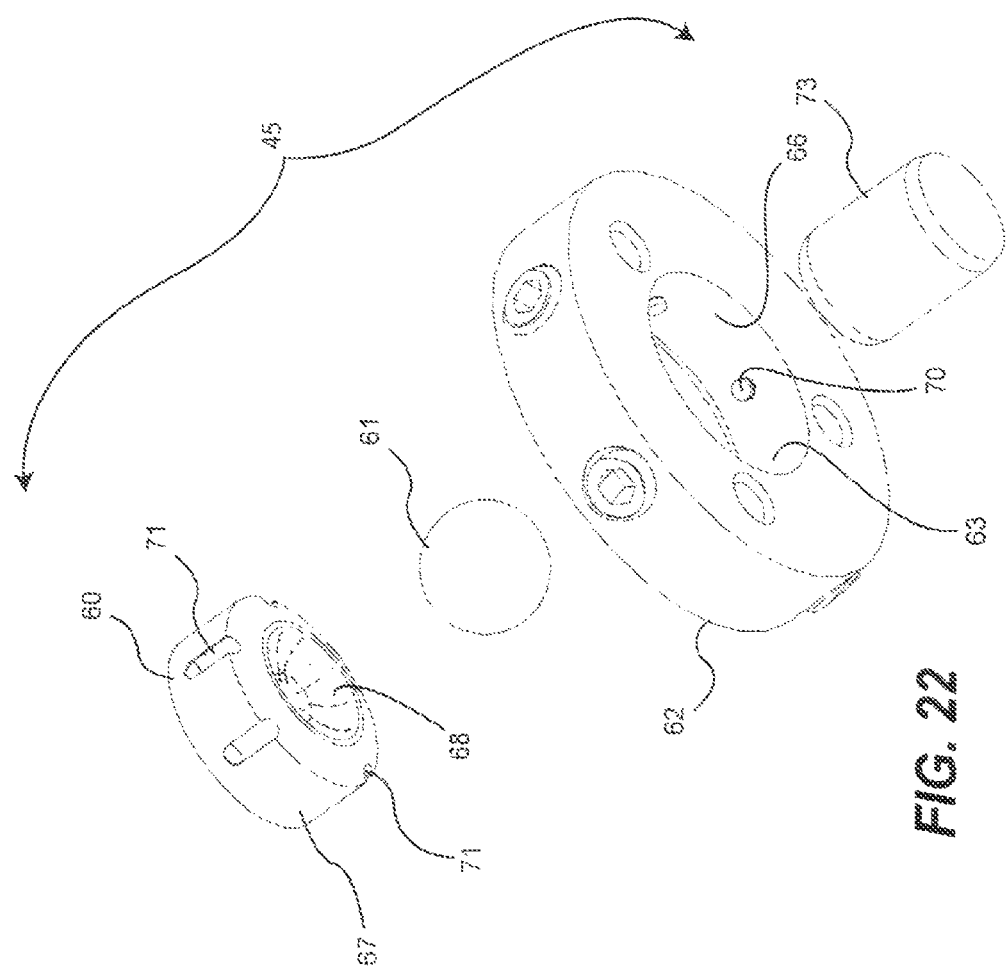
FIG. 22 is an enlarged, exploded, bottom perspective view of the compliance assembly of FIG. 15.
Figure 23:
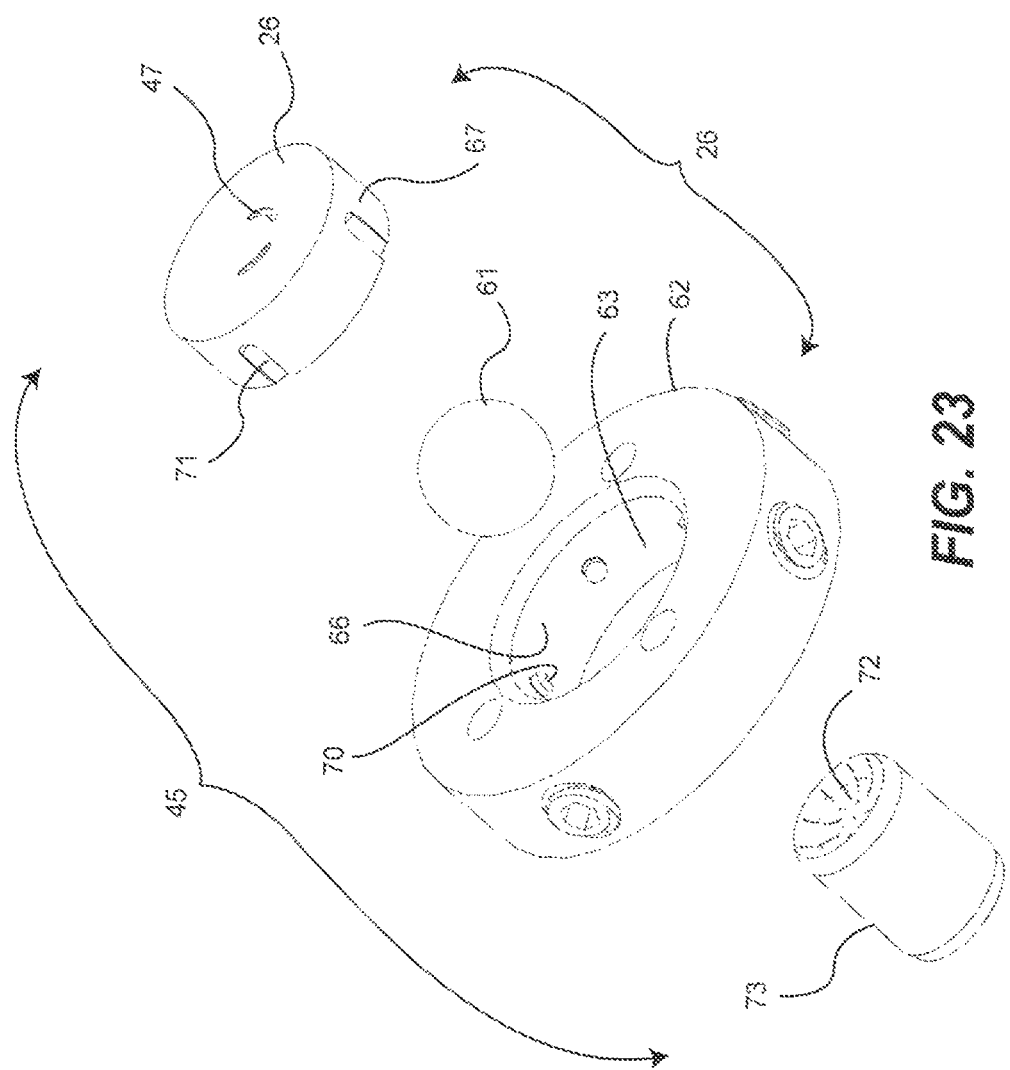
FIG. 23 is an enlarged, exploded, top perspective view of the compliance assembly of FIG. 15.
Figure 24:
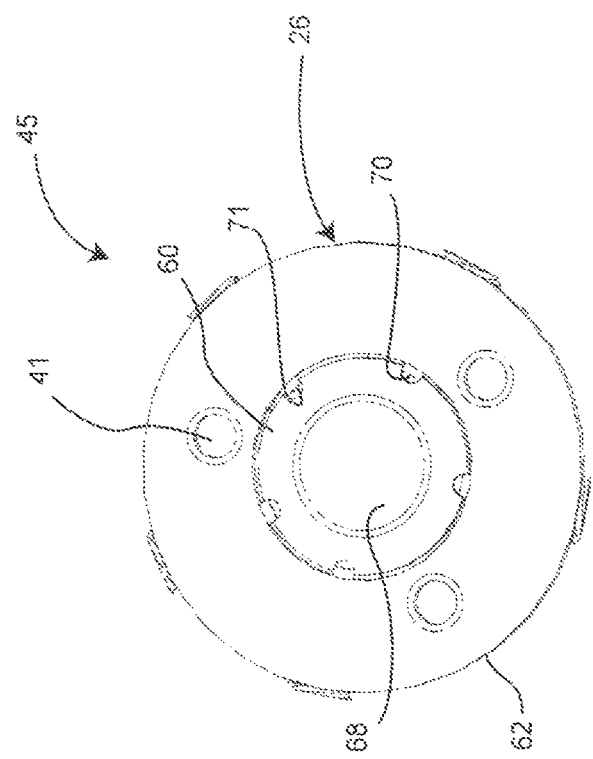
FIG. 24 is an enlarged, top plan view of the compliance assembly of FIG. 15.

Referring now to FIGS. 18 and 19, as a compression force, via spring assembly 30, axially urges the drive shaft 35 toward the stator device 21, the dowel pin 73 compresses the ball bearing 61. In turn, the ball bearing 61 transfers this axial compressive force to the rotor element 60 to form the fluid-tight seal at the rotor-stator interface.

It will be appreciated that, in order to accommodate the high compressive forces applied to the ball bearing, the diameter of the ball bearing should be at least about ½ (and preferably ⅔) the diameter of the rotor element 60. This assures that the compressive forces will be more widely distributed about the domed-shaped socket 68 of the rotor element, as compared to a more concentrated force distribution should the ball bearing be of a smaller diameter.

Although the present invention has been primarily described as applying to shear face valves for high pressure applications that require high lifecycle capabilities (e.g., such as all HPLC Instrument platforms/designs), it will be appreciated that this technology may be applied to all shear valve platforms/designs (such as AI (analytical chemistry) and IVD (In-vitro Diagnostics)).

Furthermore, while the present invention has been described in connection with the preferred form of practicing it and modifications thereto, those of ordinary skill in the art will understand that many other modifications can be made thereto within the scope of the claims that follow. Accordingly, it is not intended that the scope of the invention in any way be limited by the above description, but instead be determined entirely by reference to the claims that follow.

What is claimed is:

1. A high pressure rotary shear valve assembly having a housing defining an interior wall, said shear valve assembly comprising:
    a stator member defining a substantially planar stator face and at least two or more stator channels in fluid communication with said stator face at corresponding stator ports, said stator face being composed substantially of one of a metallic material and a ceramic material; and
    a rotor assembly including:
        a valve shaft having a rotational axis,
        a head portion coupled to a distal portion of said valve shaft, said head portion defining a distal facing seating surface,
        a rotor member having a substantially planar rotor face defining one or more rotor channels and an opposite, proximal facing contact surface, said rotor face being composed substantially of one of a metallic material and a ceramic material, said stator member and said rotor member being sufficiently compressed together at a high compression pressure enabling leak-tight, high pressure fluid flow between corresponding stator ports and at least one rotor channel at a rotor-stator interface therebetween, and
        a compliant element supportively disposed between the head portion and the rotor member such that a proximal contact face of said compliant element contacts the distal facing seating surface of said head portion along a first contact area, and an opposite, distal contact face of said compliant element contacts the proximal facing contact surface of said rotor member along a second contact area, said compliant element further being comprised of a polymer based material exhibiting high tensile and compressive strength sufficient to permit the transfer of the high compressive forces in an axial direction to the rotor face, yet sufficiently compliant to permit minute pivotal, self-reorientation of the substantially planar rotor face about said rotational axis to an orientation substantially parallel to and substantially flush against the stator face.

2. The valve assembly according to claim 1, wherein said high pressure fluid flow in the range of at least 15 kpsi to about 25 kpsi.

3. The valve assembly according to claim 1, wherein said head portion having a shaft pad, defining said seating surface, distally extending from a distal surface of said head portion.

4. The valve assembly according to claim 1, wherein said compliant element is selected essentially from the group consisting of Polyethylene Terephthalete Glycol (PETG), Polyester, Polycarbonate, a carbon filled polymer, a PEEK, a nylon and a 20%-30% carbon PEEK blend.

5. The valve assembly according to claim 1, further including:
    a tribological coating disposed atop at least said stator face.

6. The valve assembly according to claim 1, wherein said compliant element comprising a compliant shim member.

7. The valve assembly according to claim 6, wherein a thickness of said shim member is in the range of about 0.010" to about 0.040".

8. The valve assembly according to claim 1, wherein said compliant element including a compressive modulus, k, in the range of about 250 kpsi to about 300 kpsi.

9. The valve assembly according to claim 8, wherein said compliant element is comprised of one of Polyethylene Terephthalete Glycol (PETG) and Polyester or Polycarbonate.

10. The valve assembly according to claim 1, wherein said distal facing seating surface of said head portion, said proximal and distal contact face of said compliant element, and said proximal facing contact surface of said rotor member are all substantially planar.

11. The valve assembly according to claim 10, wherein said stator face of the stator element defines a stator area, and
said second contact area between said rotor member and said compliant element being greater than, and substantially in co-axial alignment with, said stator area.

12. The valve assembly according to claim 1, wherein said compliant element having a compressive modulus, k, in the range of about 400 kpsi to about 500 kpsi.

13. The valve assembly according to claim 12, wherein said compliant element is comprised of one of a polyetheretherketone (PEEK) material, a nylon material and a 20%-30% carbon polyetheretherketone (PEEK) blend.

14. The valve assembly according to claim 13, wherein a thickness of said compliant element is in the range of about 0.100" to about 0.200".

15. The valve assembly according to claim 1, wherein said compliant element defining a receiving socket, a bottom portion of which is defined by said seating surface, and formed and dimensioned for aligned, sliding axial receipt of said rotor device therein.

16. The valve assembly according to claim 15, wherein said receiving socket further defined by an interior sidewall, formed and dimensioned for press-fit receipt and contact with an outer circumferential wall of said rotor device.

17. The valve assembly according to claim 16, wherein said interior sidewall and the rotor outer circumferential wall cooperate for keyed alignment therebetween.

18. The valve assembly according to claim 17, wherein said interior sidewall and the rotor outer circumferential wall are D-shaped.

19. A high pressure rotary shear valve assembly comprising:
    a stator device defining a substantially planar stator face and at least two or more stator channels in fluid communication with said stator face at corresponding stator ports, said stator face being composed substantially of one of a metallic material and a ceramic material;
    a rotor assembly having a rotor device having a substantially planar rotor face and an opposed proximal facing contact surface oriented opposite and substantially parallel to said rotor face, said rotor device being rotatably mounted about a rotational axis, said rotor face being composed substantially of one of a metallic material and a ceramic material, said rotor assembly further including a head portion defining a substantially planar distal seating surface configured to supportively seat the contact surface of said rotor device thereatop;

said stator device and said rotor device are sufficiently compressed together at a high compression pressure enabling leak-tight, high pressure fluid flow between corresponding stator ports and at least one rotor channel at a rotor-stator interface therebetween in the range of at least 15 psi to about 25 kpsi;

a tribological coating disposed atop at least one said stator face; and a relatively thin, compliant shim member having a compressive modulus, k, in the range of about 250 to about 300 kpsi, and defining a proximal facing surface oriented opposite said contact surface of the rotor device, and disposed between, and in abutting contact with, the contact surface and the distal seating surface of said head portion, such that during said high compressive pressure, said compliant shim member permits minute pivotal, self-reorientation of the substantially planar rotor face about said rotational axis of said rotor device to an orientation substantially parallel to and substantially flush against the substantially planar stator face of the stator device for fluid-tight, selective relative rotation between the rotor face and the stator face, at the rotor-stator interface, at two or more rotor positions.

20. The valve assembly according to claim 19, wherein said shim member is comprised of one of Polyethylene Terephthalete Glycol (PETG) and Polyester or Polycarbonate.

21. The valve assembly according to claim 19, wherein said rotor assembly including a valve shaft, configured for rotation about a rotational axis of the valve assembly, said head portion being disposed at a distal end of said valve shaft.

22. The valve assembly according to claim 21, wherein a thickness of said shim member is in the range of about 0.010" to about 0.040".

23. A high pressure rotary shear valve assembly comprising:
a stator member defining a substantially planar stator face and at least two or more stator channels in fluid communication with said stator face at corresponding stator ports, said stator face being composed substantially of one of a metallic material and a ceramic material; and
a rotor assembly including:
a valve shaft having a rotational axis
a head portion coupled to a distal portion of said valve shaft, said head portion defining a distal facing seating surface,
a rotor member having a substantially planar rotor face defining one or more rotor channels and an opposite, substantially planar, proximal facing contact surface, said rotor face being composed substantially of one of a metallic material and a ceramic material, said stator member and said rotor member being sufficiently compressed together at a high compression pressure enabling leak-tight, high pressure fluid flow between corresponding stator ports and at least one rotor channel at a rotor-stator interface therebetween, and
a compliant element supportively disposed between the head portion and the rotor member such that a proximal contact face of said compliant element contacts the distal facing seating surface of said head portion along a first contact area, and a substantially planar, distal contact face of said compliant element contacts the substantially planar, proximal facing contact surface of said rotor member substantially along a second contact area,
wherein said head portion, said compliant element and said rotor member cooperate to permit minute pivotal, self-reorientation of the substantially planar rotor face about said rotational axis to an orientation substantially parallel to and substantially flush against the stator face.

24. The valve assembly according to claim 23, wherein said compliant element is selected essentially from the group consisting of Polyethylene Terephthalete Glycol (PETG), Polyester, Polycarbonate, a carbon filled polymer, a PEEK, a nylon and a 20%-30% carbon PEEK blend.

25. The valve assembly according to claim 23, wherein said high pressure fluid flow is in the range of at least 15 kpsi to about 25 kpsi.

26. The valve assembly according to claim 23, wherein said stator face of the stator element defines a stator area said second contact area between said rotor member and said compliant element being greater than, and substantially in co-axial alignment with, said stator area.

27. The valve assembly according to claim 26, further including:
a tribological coating disposed atop at least said stator face.

28. The valve assembly according to claim 27, wherein said compliant element comprises a compliant shim member.

29. The valve assembly according to claim 28, wherein a thickness of said shim member is in the range of about 0.010" to about 0.040".

30. The valve assembly according to claim 28, wherein a thickness of said compliant element is in the range of about 0.100" to about 0.200".

31. A high pressure rotary shear valve assembly comprising:
a stator member defining a substantially planar stator face and at least two or more stator channels in fluid communication with said stator face at corresponding stator ports, said stator face having a stator area, and being composed substantially of one of a metallic material and a ceramic material; and
a rotor assembly including:
a valve shaft having a rotational axis
a head portion coupled to a distal portion of said valve shaft, said head portion defining a distal facing seating surface,
a rotor member having a substantially planar rotor face defining one or more rotor channels and an opposite, proximal facing contact surface, said rotor face being composed substantially of one of a metallic material and a ceramic material, said stator member and said rotor member being sufficiently compressed together at a high compression pressure enabling leak-tight, high pressure fluid flow between corresponding stator ports and at least one rotor channel at a rotor-stator interface therebetween, and
a compliant element supportively disposed between the head portion and the rotor member such that a proximal contact face of said compliant element contacts the distal facing seating surface of said head portion along a first contact area, and an opposite, distal contact face of said compliant element contacts the proximal facing contact surface of said rotor member along a second contact area, said second contact area being greater than, and substantially in co-axial alignment with, said stator area, wherein said head portion, said compliant element and said rotor member cooperate to permit minute pivotal, self-reorientation of the substantially planar rotor face about said rotational axis to an orientation substantially parallel to and substantially flush against the stator face.

32. The valve assembly according to claim 31, wherein said compliant element is selected essentially from the group consisting of Polyethylene Terephthalete Glycol (PETG), Polyester, Polycarbonate, a carbon filled polymer, a PEEK, a nylon and a 20%-30% carbon PEEK blend.

33. The valve assembly according to claim 31, further including:
a tribological coating disposed atop at least said stator face.

34. The valve assembly according to claim 33, wherein said high pressure fluid flow is in the range of at least 15 kpsi to about 25 kpsi.

35. The valve assembly according to claim 33, wherein said compliant element comprises a compliant shim member.

36. The valve assembly according to claim 35, wherein a thickness of said shim member is in the range of about 0.010" to about 0.040".

37. The valve assembly according to claim 35, wherein a thickness of said compliant element is in the range of about 0.100" to about 0.200".

38. A high pressure rotary shear valve assembly comprising:
a stator member defining a substantially planar stator face and at least two or more stator channels in fluid communication with said stator face at corresponding stator ports, said stator face being composed substantially of one of a metallic material and a ceramic material; and
a rotor assembly including:
a valve shaft having a rotational axis,
a head portion coupled to a distal portion of said valve shaft, and defining a shaft pad distally extending from a distal surface of said head portion, said shaft pad including a distal facing seating surface,
a rotor member having a substantially planar rotor face defining one or more rotor channels and an opposite, proximal facing contact surface, said rotor face being composed substantially of one of a metallic material and a ceramic material, said stator member and said rotor member being sufficiently compressed together at a high compression pressure enabling leak-tight, high pressure fluid flow between corresponding stator ports and at least one rotor channel at a rotor-stator interface therebetween, and
a compliant element supportively disposed between the head portion and the rotor member such that a proximal contact face of said compliant element abuts the distal facing seating surface of said head portion, and an opposite, distal contact face of said compliant element abuts the proximal facing contact surface of said rotor member.

39. The valve assembly according to claim 38, further including:
a tribological coating disposed atop at least said stator face.

40. The valve assembly according to claim 38, wherein said high pressure fluid flow is in the range of about 3 kpsi to about 25 kpsi.

41. The valve assembly according to claim 38, wherein said compliant element comprises a compliant shim member.

42. The valve assembly according to claim 41, wherein said compliant element is selected essentially from the group consisting of Polyethylene Terephthalete Glycol (PETG), Polyester, Polycarbonate, a carbon filled polymer, a PEEK, a nylon and a 20%-30% carbon PEEK blend.

43. A high pressure rotary shear valve assembly having a housing defining an interior wall, said shear valve assembly comprising:
a stator device defining a substantially planar stator face and at least two or more stator channels in fluid communication with said stator face at corresponding stator ports, said stator face being composed substantially of one of a metallic material and a ceramic material;
a rotor assembly having a rotor device having a substantially planar rotor face, said rotor device being rotatably mounted about a rotational axis, said rotor face being composed substantially of one of a metallic material and a ceramic material;
said stator device and said rotor device are compressed together in a manner creating a high compression pressure at a rotor-stator interface therebetween in the range of at least 15 kpsi to about 25 kpsi;
a compliance assembly cooperating with the rotor device, and said rotor device configured, relative to the housing interior wall, to permit minute pivotal, self-reorientation of the substantially planar rotor face about said rotational axis of said rotor device to an orientation substantially parallel to and substantially flush against the substantially planar stator face of the stator device for fluid-tight, selective relative rotation between the rotor face and the stator face, at the rotor-stator interface, at two or more rotor positions;
said rotor assembly including a valve shaft, configured for rotation about a rotational axis of the valve assembly, and a head portion disposed at a distal end of said valve shaft, said head portion defining a distal seating surface configured to seat a metallic rotor element of the rotor device thereon;
said compliance assembly including a ball bearing member disposed between said head portion of said rotor assembly and said rotor element, enabling minute compliant pivotal motion of said rotor face about said ball bearing member;
said head portion having a distal seating surface that defines a dome-shaped socket formed and dimensioned for receipt of a portion of said ball bearing member therein;
said rotor element having a proximal facing contact surface oriented opposite said rotor face, said contact surface defining a dome-shaped ball socket formed and dimensioned for pivotal receipt of another portion of said ball bearing member therein;
said compliance assembly further including a drive ring disposed adjacent said seating surface of said head portion, and having an interior wall defining a central through-passage formed and dimensioned for axial sliding receipt of said rotor element therein in a manner enabling minute pivotal movement atop said ball bearing member;
said compliance assembly further includes an alignment structure configured for aligned cooperation between said rotor element and drive ring;

said rotor element having a substantially cylindrical sidewall extending between said rotor face and said contact surface, said sidewall defining two or more elongated receiving slots oriented substantially parallel to said rotational axis, and axially extending from about a central portion of said sidewall to said contact surface; and said alignment structure including two or more corresponding guide pins extending radially inward from said interior wall of said drive ring, said guide pins being sized and dimensioned for sliding axial receipt in a corresponding receiving slot.

* * * * *